United States Patent
Mao et al.

(10) Patent No.: US 8,957,644 B2
(45) Date of Patent: Feb. 17, 2015

(54) HIGH EFFICIENCY HIGH POWER DENSITY POWER ARCHITECTURE BASED ON BUCK-BOOST REGULATORS WITH A PASS-THROUGH BAND

(75) Inventors: Hengchun Mao, Plano, TX (US); Dianbo Fu, Richardson, TX (US); Bing Cai, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 580 days.

(21) Appl. No.: 12/973,521

(22) Filed: Dec. 20, 2010

(65) Prior Publication Data

US 2012/0049819 A1    Mar. 1, 2012

Related U.S. Application Data

(60) Provisional application No. 61/376,994, filed on Aug. 25, 2010.

(51) Int. Cl.
| | | |
|---|---|---|
| *G05F 1/24* | (2006.01) | |
| *H02M 3/158* | (2006.01) | |
| *H02J 1/10* | (2006.01) | |

(52) U.S. Cl.
CPC ............ *H02M 3/1582* (2013.01); *H02J 1/102* (2013.01)
USPC ........................................................ 323/259

(58) Field of Classification Search
USPC ........................................................ 323/259
See application file for complete search history.

(56) References Cited

U.S. PATENT DOCUMENTS

| | | | |
|---|---|---|---|
| 4,395,675 A | | 7/1983 | Toumani |
| 5,418,704 A | * | 5/1995 | Hua et al. ............... 323/222 |
| 5,932,995 A | * | 8/1999 | Wagoner ............... 323/282 |
| 5,949,224 A | | 9/1999 | Barkaro |
| 6,037,755 A | | 3/2000 | Mao et al. |
| 6,046,915 A | * | 4/2000 | Jacobs et al. ............... 323/217 |
| 6,166,527 A | | 12/2000 | Dwelley et al. |
| 6,275,016 B1 | | 8/2001 | Ivanov |
| 6,348,781 B1 | | 2/2002 | Midya et al. |
| 6,882,130 B2 | | 4/2005 | Handa et al. |

(Continued)

FOREIGN PATENT DOCUMENTS

| | | |
|---|---|---|
| CN | 1504010 A | 6/2004 |
| CN | 101247053 A | 8/2008 |

(Continued)

OTHER PUBLICATIONS

Sayani, Mahmoud P., et al.; "Analyzing and Determining Optimum On-Board Power Architectures for 48V-input Systems," APEC, 2003, 5 pages.

(Continued)

*Primary Examiner* — Jue Zhang
(74) *Attorney, Agent, or Firm* — Conley Rose, P.C.; Grant Rodolph; William H. Dietrich

(57) ABSTRACT

A power system comprising a non-isolated voltage regulator configured to couple to an input voltage and produce an output voltage, wherein the non-isolated voltage regulator is in a power distribution system and configured to boost the input voltage when the input voltage is less than a minimum output voltage, to reduce the input voltage when the input voltage is greater than a maximum output voltage, and to pass-through the input voltage when the input voltage is greater than or equal to the minimum output voltage and less than or equal to the maximum output voltage.

20 Claims, 19 Drawing Sheets

(56) References Cited

U.S. PATENT DOCUMENTS

| | | | |
|---|---|---|---|
| 6,930,893 B2 | 8/2005 | Vinciarelli | |
| 6,975,098 B2 | 12/2005 | Vinciarelli | |
| 6,984,965 B2 | 1/2006 | Vinciarelli | |
| 6,984,967 B2 | 1/2006 | Notman | |
| 7,265,524 B2 | 9/2007 | Jordan et al. | |
| 7,570,033 B1 | 8/2009 | Ju | |
| 2007/0075689 A1* | 4/2007 | Kinder et al. | 323/259 |
| 2007/0273341 A1* | 11/2007 | Shimizu | 323/224 |

FOREIGN PATENT DOCUMENTS

| | | |
|---|---|---|
| CN | 101499718 A | 8/2009 |
| CN | 101771348 A | 7/2010 |
| DE | 102006014780 A1 | 10/2007 |
| JP | 2003274570 A | 9/2003 |
| WO | 2006054412 A1 | 5/2006 |

OTHER PUBLICATIONS

Jugan, D., et al., "Powering Architectures for New Needs in Telecommunications," Intelec, 1995, pp. 196-202.

Vazquez, M., et al; "Procedure to Select the Optimised Power Architecture for a Telecommunications Network of Remote Units," Intelec, 1999, 6 pages.

Foreign Communication From a Related Counterpart Application, PCT Application PCT/CN2011/078348, International Search Report dated Nov. 3, 2011, 6 pages.

Foreign Communication From a Related Counterpart Application, PCT Application PCT/CN2011/078348, Written Opinion dated Nov. 3, 2011, 9 pages.

* cited by examiner

HIGH EFFICIENCY HIGH POWER DENSITY POWER ARCHITECTURE BASED ON BUCK-BOOST REGULATORS WITH A PASS-THROUGH BAND

CROSS-REFERENCE TO RELATED APPLICATIONS

The present application claims priority to U.S. Provisional Patent Application No. 61/376,994 filed Aug. 25, 2010 by Hengchun Mao, et al. and entitled "High Efficiency High Power Density Power Architecture Based on Buck-Boost Regulators with a Pass-Through Band," which is incorporated by reference herein as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The power system of electronic equipment needs to convert its input power to voltages acceptable to its load. The power system usually consists of many modules and components, and the architecture of the power system illustrates the interconnection of the said modules and main components. Usually, the power system is divided into two parts: power distribution from the input source to a circuit card, and power conversion on a circuit card. To reduce the voltage and current stresses of components on a circuit card, it is desirable to have one or more voltage regulators in the power distribution. The voltage regulators convert an input voltage from a power or voltage source to an output voltage within a voltage range that is suitable for the circuit cards of the electronics equipment. One or a plurality of voltage regulators can be used to deliver regulated power or voltage to one or a plurality of circuit cards in electronics equipment. In many systems, the input voltage from the power source to the voltage regulators and the output voltage from the voltage regulators to the loads are both direct current (DC). Accordingly, a significant part of the power system is a DC system. In many applications, it is desirable to design or configure the power system to operate at relatively high efficiency and provide relatively high power to electronics equipment. For example, the power system architectures may be optimized to reduce power consumption, provide stable and reliable operations, and/or reduce system space and thus system cost.

SUMMARY

In one embodiment, the disclosure includes a power system comprising a non-isolated voltage regulator in a power distribution system configured to couple to an input voltage and produce an output voltage, wherein the non-isolated voltage regulator is configured to boost the input voltage when the input voltage is less than a minimum output voltage, to reduce the input voltage when the input voltage is greater than a maximum output voltage, and to pass-through the input voltage when the input voltage is greater than or equal to the minimum output voltage and less than or equal to the maximum output voltage.

In another embodiment, the disclosure includes a non-isolated voltage regulator comprising a positive input lead, a positive output lead coupled to the positive input lead, a negative input lead, a negative output lead coupled to the negative input lead, a first switching component positioned between the positive input lead and the positive output lead, and a second switching component positioned between the negative input lead and the negative output lead.

In yet another embodiment, the disclosure includes a method comprising controlling a first gate voltage in a first switching component on a first power lead of a first non-isolated voltage regulator to control current on the first power lead, and controlling a second gate voltage in a second switching component on a second power lead of the first non-isolated voltage regulator to control current on the second power lead, wherein each of the first power lead and the second power lead shares current with a third power lead of a second non-isolated voltage regulator coupled in parallel to the first non-isolated voltage regulator.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
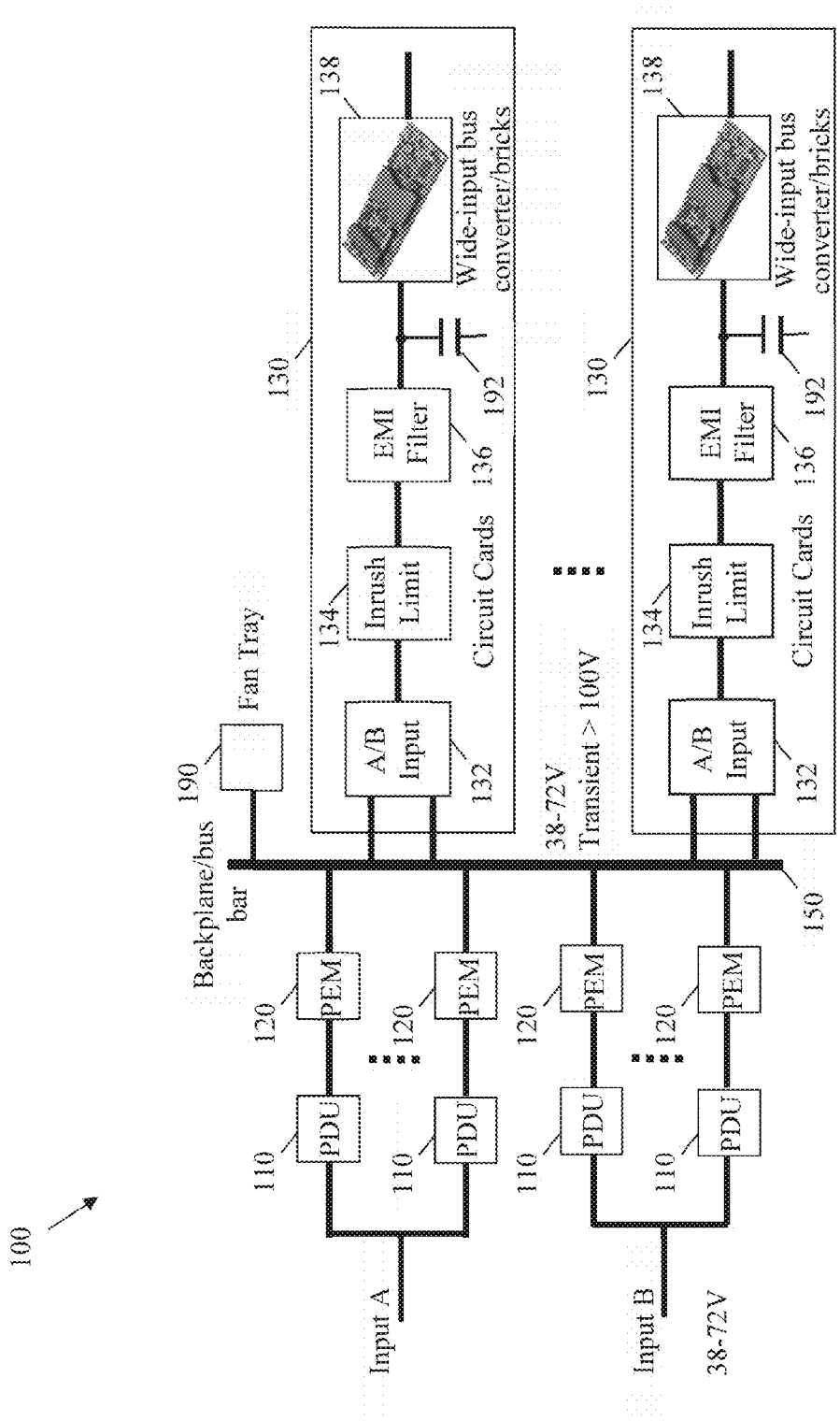
FIG. 1 is a typical architecture of a power system.

FIG. 1 illustrates a typical architecture of a power system 100 that may be used to regulate/control power for electronics equipment, such as telecommunication equipment. The power system 100 may be a DC system that receives a plurality of DC voltage inputs (e.g. Input A and Input B) and provides a plurality of regulated DC voltage outputs to a plurality of loads in the electronics equipment to improve reliability. For example, in telecommunication equipment, the input voltages may have a relatively wide voltage range, e.g. from about 38 volts (V) to about 72 V, which may cause current and voltage stresses on the components in the power system. The DC voltage inputs may be supplied by a DC power source, such as a battery, or by an alternating current (AC) power source through an AC/DC power converter, which may be located on site, such as on the same platform as the components of the power system 100, or separately at a different site.

The power system 100 may comprise a plurality of power distribution units (PDUs) 110 and/or power entry modules (PEMs) 120 coupled to the input voltages and a plurality of circuit cards 130 coupled to the PDUs 110/PEMs 120. The power system 100 may also comprise a bus 150 that may be positioned between the PDUs 110/PEMs 120 and the circuit cards 130, and a fan tray 190 that may be coupled to the bus 150. Each of the circuit cards 130 may comprise an A/B input combining circuit 132 and a bus converter/brick 138. In some designs, a circuit card 130 may also comprise an inrush limit circuit 134 and/or an electromagnetic interference (EMI) filter 136, which may be positioned between the A/B input combining circuit 132 and the bus converter/brick 138. Additionally, a capacitor 192 may be positioned between the bus converter/brick 138 and the inrush limit circuit 134/EMI filter 136, as shown in FIG. 1. The circuit cards 130 may have loads and other power supplies or power converters to convert the output voltage or the input voltage of the bus converter to voltages acceptable to the loads. The PDUs 110/PEMs 120 may be located on site or on the same platform as the circuit cards 130, or separately at a different site, for example at the location of the power source.

As shown in FIG. 1, a subset of PDUs 110/PEMs 120 may be coupled in parallel between each input (e.g. Input A and Input B) and the bus 150. For instance, a plurality of parallel pairs of PDU 110 and PEM 120 that are in series may be positioned between each input and the bus 150. A plurality of circuit cards 130 may be coupled to the bus 150. As such, the input voltages may pass-through PDUs 110/PEMs 120 and may be distributed to the circuit cards 130 via the bus 150. The bus 150 may be a backplane or a bar bus that transfers the voltages/current from the PDUs 110/PEMs 120 to the circuit cards 130. The fan tray 190 may be used to control the temperature of components in the system.

At the circuit cards 130, the A/B input combining circuits 132 may be any devices configured to combine the voltages that correspond to the different inputs. Specifically, in the case of multiple inputs, a separate path may be used to deliver power from each input and subsequently the power may be combined in the A/B input combining circuits 132 on the circuit cards 130. For instance, in the case of two inputs, Input A and Input B, the A/B input combining circuit 132 may combine the two corresponding voltages that are received on the bus 150. In other designs, the A/B input combining circuit 132 may combine the voltages from more than two inputs. Additionally, in some systems, the inrush limit circuits 134 and the EMI filters 136 may be used to provide soft-start and hot swap functions. The capacitor 192 may be used to further stabilize the voltage at the bus converter/brick 138.

The bus converters/bricks 138 may be any devices configured to convert or regulate the received voltages to meet the requirements of the loads in the equipment or provide a suitable input to subsequent power converters. For instance, each circuit card 130 may be coupled to a plurality of loads (not shown) that require different voltages/currents to operate. The bus converters/bricks 138 may also provide isolation between the inputs and the loads. On-card power conversion may be implemented in various approaches. In one approach, the combined and filtered inputs may be converted using the bus converters/bricks 138 and subsequently using point-of-load (POL) converters to further regulate the outputs for the loads. In another approach, the combined and filtered voltages may be directly regulated using isolated power converters in the power system 100.

In the power system 100, the separate delivery paths between the inputs and the circuit cards may be relatively long and may require substantial space and resources. Further, a relatively wide voltage range may be delivered to the circuit cards, which may cause substantial stress in the components on the circuit cards. The stress in the components may cause substantial power loss and/or require more component space, which may result in low efficiency, low power density, and/or higher cost.

Figure 2:
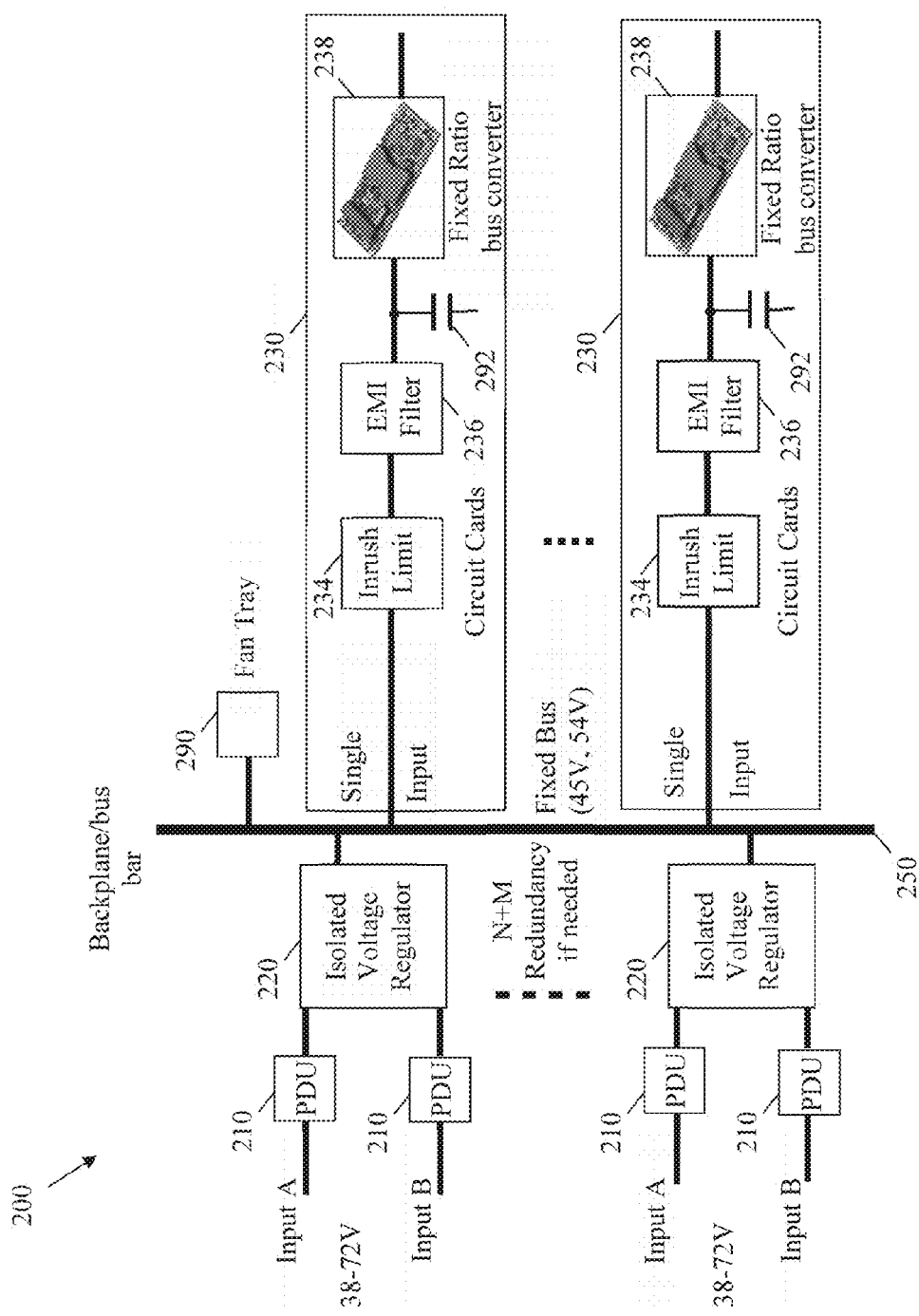
FIG. 2 is another architecture of a power system.

FIG. 2 illustrates an architecture of another power system 200 that may implement one or a plurality of isolated voltage regulators to regulate voltages to circuit cards in the equipment. Similar to the architecture of the power system 100, the power system 200 may receive a plurality of DC power/voltage inputs (e.g. Input A and Input B) and provide a plurality of regulated DC voltage outputs to a plurality of loads in the electronics equipment. However, the power system 200 uses a plurality of isolated voltage regulators to provide substantially fixed voltages to circuit cards of the power system 200, and thus reduce voltage and current stress on the components.

In some cases, the quantity of isolated voltage regulators and possibly other components may exceed the quantity of components necessary for the power system 200 to function properly. For example, M+N modules or components that include isolated voltage regulators may be used instead of a minimum quantity of necessary components N (N and M are integers). The additional M components may be redundant components that may improve the system reliability. Thus, if some components fail, the power system 200 may still use at least N components to function properly.

The power system 200 may comprise a plurality of PDUs 210 coupled to the input voltages, a plurality of isolated voltage regulators 220 coupled to the PDUs 210, and a plurality of circuit cards 230 coupled to the isolated voltage regulators 220. The power system 200 may also comprise a bus or backplane 250 that may be positioned between the isolated voltage regulators 220 and the circuit cards 230, and a fan tray 290 that may be coupled to the bus 250. On each of the circuit cards 230, there may exist an inrush limit circuit 234 and/or an EMI filter 236 coupled to the bus 250, and a bus converter/brick 238 coupled to the inrush limit circuit 234/EMI filter 236. A capacitor 292 may also be positioned between the bus converter/brick 238 and the inrush limit circuit 234/EMI filter 236, as shown in FIG. 2. The PDUs 210 and the isolated voltage regulators 220 may be located on site or same platform as the circuit cards 230 or separately at a different site.

As shown in FIG. 2, a pair of PDUs 210 may be coupled between two corresponding inputs (e.g. Input A and Input B) and an isolated voltage regulator 220, which may be coupled to the circuit cards 230 via the bus 250. The isolated voltage regulator 220 may be configured to convert the input voltages into substantially fixed output voltages to reduce stress on the components of the circuit cards 230. For example, in telecommunications systems, the input voltages may vary from about 38 V to about 72 V and the output voltages may be fixed at about 45 V or 54 V. In this case, the bus converters/bricks 238 may comprise fixed ratio bus converters that convert the fixed voltages from the isolated voltage regulator 220 into suitable voltage values for the point of load converters and loads on the circuit cards. The remaining components of the power system 200 may be configured substantially similar to the corresponding components of the power system 100. Using the isolated voltage regulator 220 in the power system 200 may increase the efficiency and power density and reduce cost in the circuit cards 230, e.g. in comparison to the power system 100. However, the isolated voltage regulator 220 may be complex and have relatively low efficiency. Thus, the overall efficiency of the system may not substantially improve.

Disclosed herein are systems, apparatuses, and methods for supporting and providing high efficiency and high density power system, e.g. in comparison to existing power system architectures, that use voltage regulators for electronics equipment. The power systems may comprise at least one non-isolated voltage regulator that may convert a voltage input from a power source into a regulated voltage output. The regulated voltage output may be delivered from the non-isolated voltage regulator(s) to at least one circuit card. The non-isolated voltage regulator may be used to control the voltage output within an acceptable or suitable range to reduce the power stress on the load or the electronics equipment. The non-isolated voltage regulator may be configured to operate a substantial amount of time (e.g. during steady state operation) within a pass-through mode, where the non-isolated voltage regulator's switching components (e.g. switches) may not be switched regularly to improve the power efficiency of the power system and/or system reliability. Further, a plurality of non-isolated voltage regulators may be combined, e.g. in parallel, to convert a plurality voltage inputs for one or a plurality of circuit cards in the electronics equipments. The voltage regulators may also be configured for current sharing on positive leads, negative leads, or both, and may provide a combined voltage output.

The non-isolated voltage regulator may comprise a Buck converter circuit, a Boost converter circuit, a Buck-Boost converter circuit, or combinations thereof. When the voltage regulator receives a voltage input above a desired voltage range, the voltage regulator may operate in Buck mode to provide a voltage output that is less than the voltage input and within the range. Alternatively, if the voltage input to the voltage regulator is below the desired range, the voltage regulator may operate in Boost mode to provide a voltage output that is greater than the voltage input and within the range. However, if the voltage input is within the desired range, the voltage regulator may operate in the pass-through mode, where the voltage regulator may not substantially change the voltage input and thus provide a voltage output that may be close or about equal to the voltage input.

Figure 3:
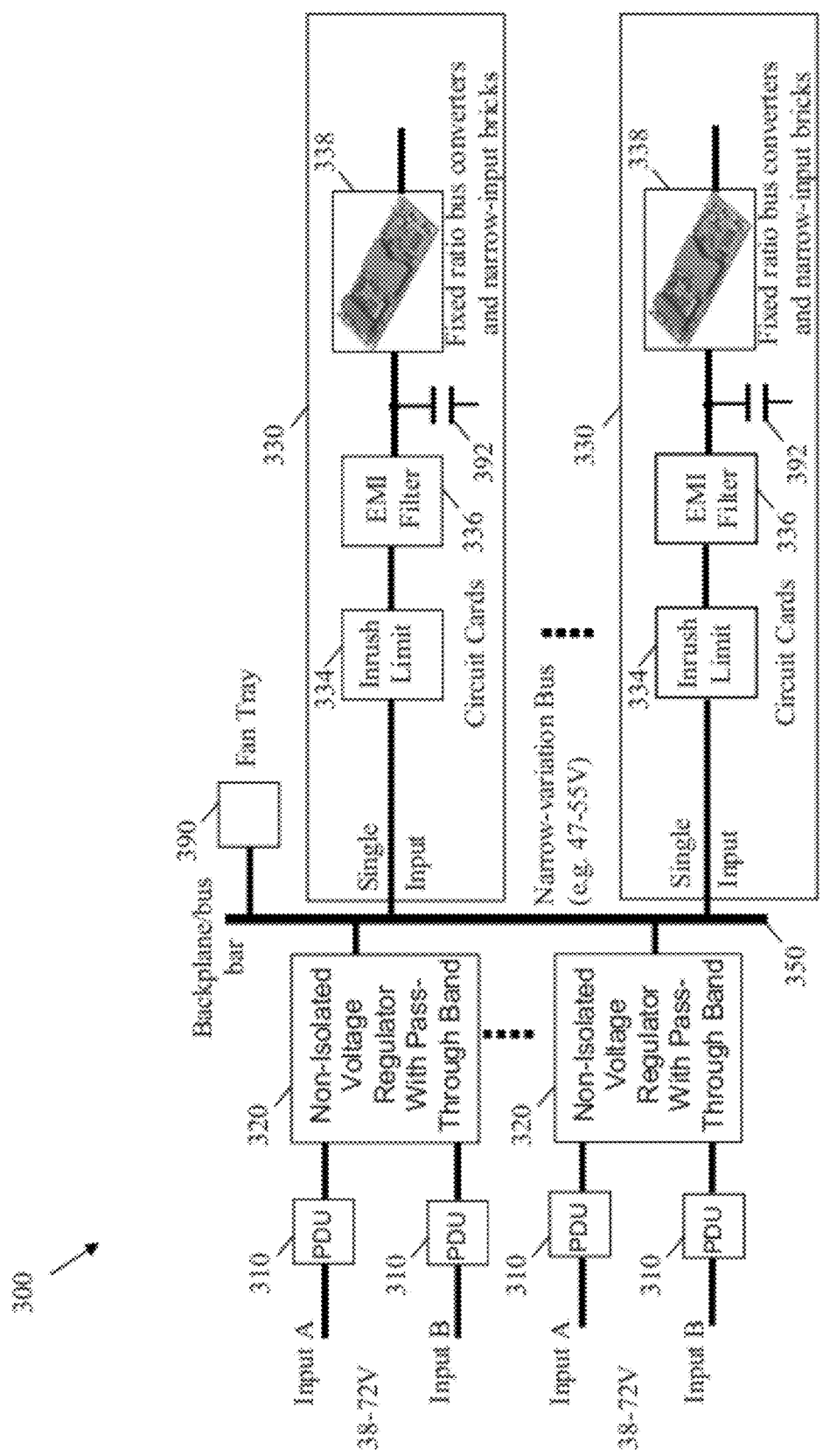
FIG. 3 is an embodiment of a new architecture for a power system.

FIG. 3 illustrates an embodiment of an architecture for a power system 300 that may implement a plurality of non-isolated voltage regulators and use a pass-through mode to regulate power for electronics equipment. The power system 300 may receive one or a plurality of DC power/voltage inputs (e.g. Input A and Input B) and provide a plurality of regulated DC voltage outputs to a plurality of loads in the electronics equipment. However, unlike the power system architectures above, the power system 300 may use one or a plurality of non-isolated voltage regulators to provide regulated voltages within a relatively narrow voltage range (with respect to the input voltages) to some components of the power system 300 and subsequently to the circuit cards in the equipment. Providing such components with a narrower voltage range than the input voltages may reduce the power loss of the components and the voltage and current stresses on the components. The non-isolated voltage regulators may also be less complex and may be configured to have higher efficiency than the isolated voltage regulators, e.g. the isolated voltage regulators 220. Thus, the power system 300 may have higher efficiency, higher power density, and lower cost than other power systems, such as for the power system 100 and the power system 200.

The power system 300 may comprise a plurality of PDUs 310 coupled to the input voltages, a plurality of non-isolated voltage regulators 320 coupled to the PDUs 310, and a plurality of circuit cards 330 coupled to the non-isolated voltage regulators 320. The power system 300 may also comprise a bus or back plane 350 that may be positioned between the non-isolated voltage regulators 320 and the circuit cards 330, and a fan tray 390 that may be coupled to the bus 350. Further, on each of the circuit cards 330 there may exist an inrush limit circuit 334 and/or an EMI filter 336 coupled to the bus 350, a bus converter/brick 338 coupled to the inrush limit circuit 334/EMI filter 336, and a capacitor 392 that may be positioned between the bus converter/brick 338 and the inrush limit circuit 334/EMI filter 336. The components of the power system 300 may be arranged as shown in FIG. 3, and may be configured substantially similar to the corresponding components of the power system 300.

However, unlike the power system 200 that uses the isolated voltage regulators 220 to provide fixed voltages to the circuit cards 230, the power system 300 may use the non-isolated voltage regulators 320 to provide voltages that have a narrower range than any of the input voltages or combination of the input voltages, Input A and Input B, to the circuit cards 330. Specifically, the non-isolated voltage regulators 320 may comprise a Buck converter, a Boost converter, a Buck-Boost converter, or combinations thereof and accordingly operate in Buck mode, Boost mode, and/or Buck-Boost mode. As such, the non-isolated voltage regulators 320 may increase or decrease the input voltages if the input voltages or combined input voltages are not within a desired or narrow range that is provided to the circuit cards 330.

Additionally, the non-isolated voltage regulators 320 may be configured to operate in a pass-through mode if the input voltages or combined input voltages are within the desired narrow range. In the pass-through mode, the switching components of the non-isolated voltage regulators 320 (e.g. a plurality of switches and/or diodes) may not be switched regularly, which allows the input voltages to pass to the circuit cards 330 without substantial change. The desired narrow range may be set, e.g. by design, to operate the non-isolated voltage regulators 320 most of the time in the pass-through mode, which may reduce operation power loss. Therefore, the pass-through mode operation may further improve efficiency and power density in the power system 300. The different components and different operation modes of the non-isolated voltage regulators 320 are described in further detail below.

Figure 4:
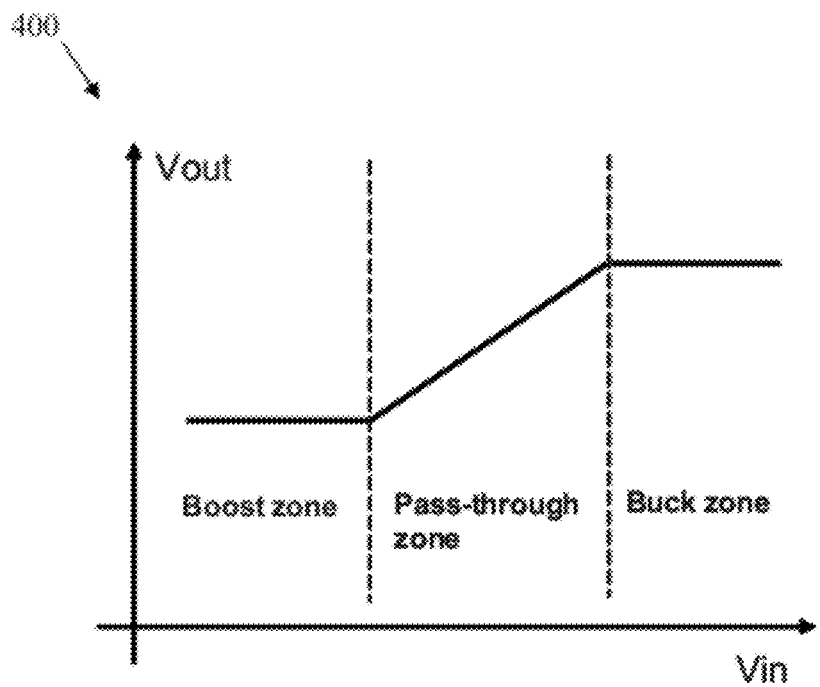
FIG. 4 is a chart of an embodiment of various operational modes.

FIG. 4 illustrates an embodiment of various operational modes 400 for a non-isolated voltage regulator in a power system, e.g. the non-isolated voltage regulator 320 in the power system 300. The various operational modes 400 may comprise the pass-through mode and the Buck mode, or the Boost mode, or both. Specifically, an output voltage (Vout) from the non-isolated voltage regulator may be regulated at about constant value in the Boost mode and/or the Buck mode and vary similarly to an input voltage (Vin) to the voltage regulator in the pass-through mode. For instance, Vout may be equal to a minimum of a desired output voltage range in the Boost mode and to a maximum of the desired output voltage range in the Buck mode.

FIG. 4 shows the relationship between Vin and Vout in three subsequent zones (e.g. zones in which Vin may move to over time): a Boost zone, a pass-through zone, and a Buck zone. In the Boost zone, Vin may be below the desired voltage range of the circuit cards or loads. Thus, the non-isolated voltage regulator may operate in the Boost mode, where Vout may be greater than Vin. This is represented by a horizontal straight line relationship between Vout and Vin that indicates about constant value for Vout at the minimum of the desired voltage range and smaller values for Vin. In the pass-through mode, Vin may be within the desired voltage range for operation. Thus, the non-isolated voltage regulator may operate in the pass-through mode, where Vout may be about equal to Vin. This is represented by a straight line relationship that has a slope of about one and indicates similar Vin and Vout values, which extend from the minimum to the maximum of the desired voltage range. In the Buck zone, Vin may be above the desired voltage range of the circuit cards or loads. Thus, the non-isolated voltage regulator may operate in the Buck mode, where Vout may be less than Vin. This is represented by a second horizontal straight line relationship between Vout and Vin that indicates about constant value for Vout at the maximum of the desired voltage range and greater values for Vin.

Figure 5:
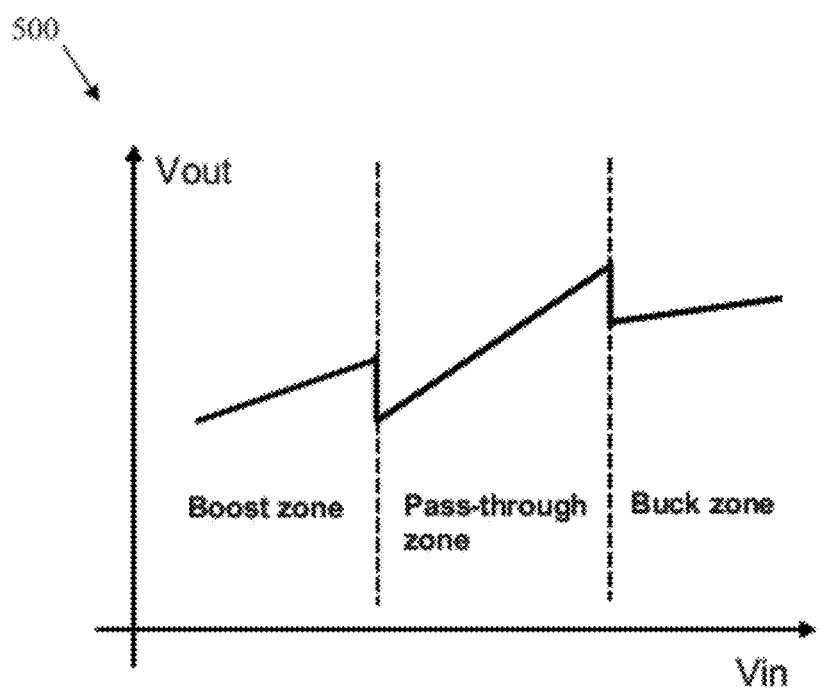
FIG. 5 is a chart of another embodiment of various operational modes.

Many variations in the operational modes are possible. FIG. 5 illustrates another embodiment of a various operational modes 500 for a non-isolated voltage regulator. Similar to the various operational modes 400, the various operational modes 500 may also comprise the pass-through mode and the Buck mode, or the Boost mode, or both. In the pass-through mode of the various operational modes 500, Vout may be similar to Vin, as was in the case of the various operational modes 400. However, in the Boost mode and/or the Buck mode of the various operational modes 500, Vout may be regulated at varying (e.g. non-constant) values based on Vin (instead of a constant value). As such, the Boost mode and/or the Buck mode may provide non-constant Vout based on Vin. For instance, Vout may be greater than Vin at the minimum of the desired output voltage range in the Boost mode and less than Vin at the maximum of the desired output voltage range in the Buck mode. In other embodiments, the various operational modes 500 may have different relationships between Vout and Vin in any of the operation modes than the various operational modes 400 and the various operational modes 500, for example according to the power system requirements. For instance, in some actual designs, the transitions between the pass-through mode and the Boost/Buck mode(s) may be smoother than is shown in FIG. 4 and FIG. 5. Many variations of the operational modes may also be possible.

The desired output voltage range from the non-isolated voltage regulator may be designed to improve the power efficiency of the power system. For instance, increasing the voltage range, such as the difference between the minimum and maximum values, may increase the pass-through time operation of the non-isolated voltage regulator and thus reduce power consumption in the power system 300. Alternatively, reducing the voltage range may reduce stress on the electronics components and design complexity. Thus, a compromise may be decided to improve overall efficiency and power density. In an embodiment, the output voltage range or Vout may be pre-calculated according to Vin, input current, output power, other operation condition, or combinations thereof. In another embodiment, Vout may be adjusted on-line, e.g. in real time in a dynamic manner, based on operation parameters such as input current, input power, output power, etc. to improve efficiency.

Further, the non-isolated voltage regulator may be configured to operate in the pass-through mode during substantially entire steady state operation to improve the steady state efficiency of the system. As such, the non-isolated voltage regulator may operate in Buck mode and/or Boost mode only during relatively short intervals, such as after a primary power source is lost and until a backup source (e.g. battery) turns on or when there is a temporary voltage surge from the power source. To improve the efficiency during Buck/Boost mode(s), the non-isolated voltage regulator may be operated in a switched operation mode, e.g. using pulse width modulation, frequency modulation, or other control methods to control the voltage regulator switches.

In some cases, the Buck or Boost mode may not be necessary, which may simplify the circuit design. For example, if the input source is substantially close to the electronics equipment, then the input voltage at the equipment may not have substantial surges. Thus, the Buck mode operation and the corresponding components (e.g. Buck converter components) may not be used in the voltage regulator and the voltage regulator may only support the pass-through and Boost modes.

Figure 6:
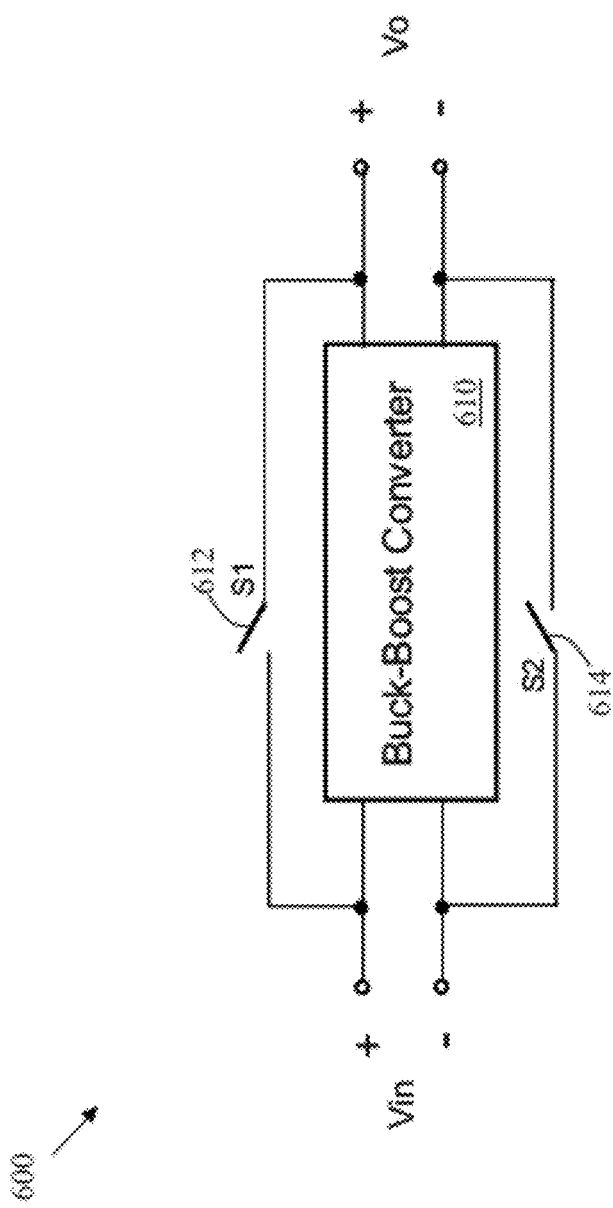
FIG. 6 is a schematic diagram of an embodiment of a voltage regulator.

FIG. 6 illustrates an embodiment of a non-isolated voltage regulator 600 that may be configured to operate in pass-through mode. The non-isolated voltage regulator 600 may comprise a Buck-Boost converter 610, a first switch (S1) 612 on a positive power line or lead, and a second switch (S2) 614 on a negative power line or lead. In other embodiments, the non-isolated voltage regulator 600 may comprise a Buck converter, a Boost converter, or both, for example instead of the Buck-Boost converter 610. The S1 612 and S2 614 switches may correspond to mechanical switches, such as relays, and/or semiconductor switches, such as metal-oxide-semiconductor field-effect transistor (MOSFET), bipolar junction transistor (BJT), insulated gate bipolar transistor (IGBT), or combinations thereof. The term "switching component" is used to generically describe switches, diodes, or any other switching components.

During the pass-through mode, the S1 612 and S2 614 switches may be closed, which may allow the input voltage/current to bypass the Buck-Boost converter 610 and may provide a similar output voltage from the non-isolated voltage regulator 600. In some cases, the switch S1 612 and/or S2 614 may comprise a plurality of semiconductor switches that are configured to block voltage/current in one direction (e.g. left or right) or both directions. In other embodiments, the non-isolated voltage regulator 600 may comprise a single switch instead of two switches on the positive or negative power line, such as when a plurality of voltage regulators share the same positive or negative power line. In other embodiments, the Buck-Boost converter 610 or other converter may have a built-in pass-through function and thus the external switches S1 612 and S2 614 may not be needed. As such, the converter's built-in switches may be configured to implement the pass-through mode, as described below.

Figure 7:
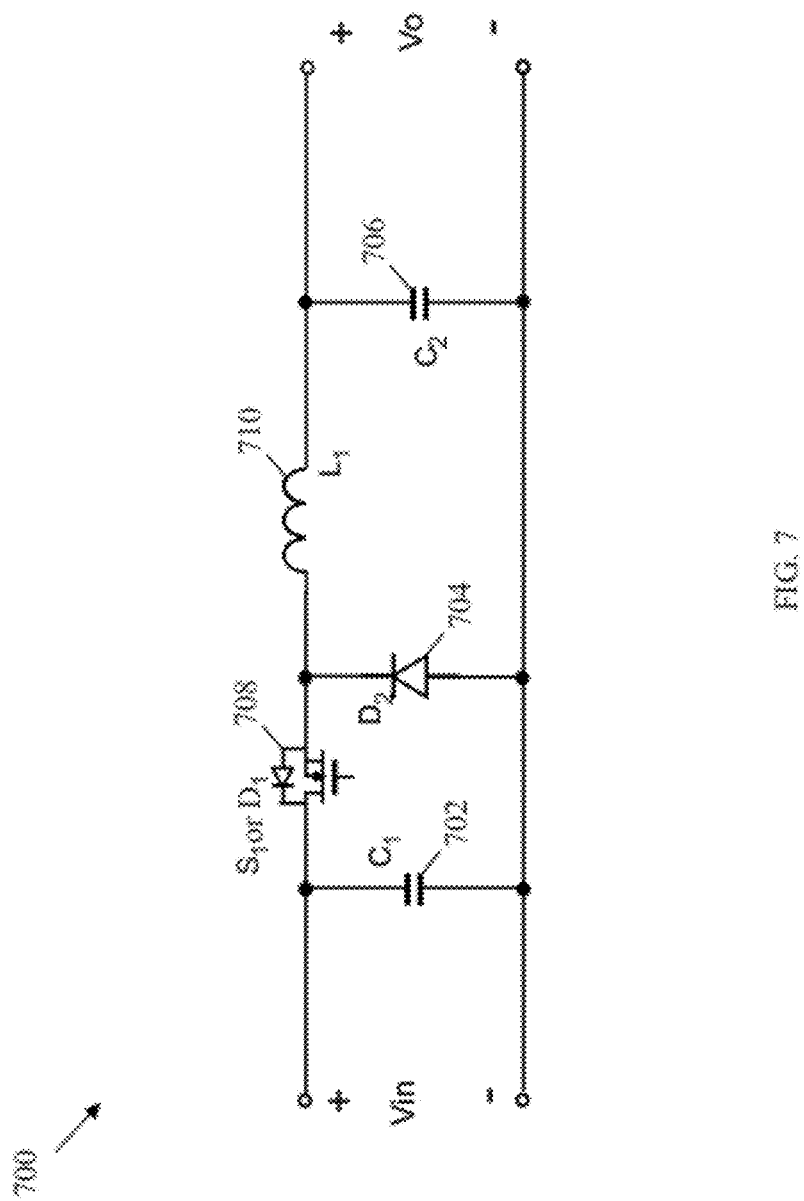
FIG. 7 is a schematic diagram of an embodiment of a Buck converter.

FIG. 7 illustrates an embodiment of a Buck converter 700, which may be used as a non-isolated voltage regulator or a part of the voltage regulator, e.g. in the power system 300. The Buck converter 700 may implement the Buck mode operation and have a built-in pass-through function, e.g. based on an internal switch. The Buck converter 700 may comprise a buck switch ($S_1$) 708, a freewheeling diode ($D_2$) 704 and an output capacitor ($C_2$) 706, which is arranged in parallel to the output voltage (Vout), as shown in FIG. 7. $S_1$ may comprise a semiconductor switch, such as MOSFET, BJT, IGBT, or combinations thereof. $D_2$ may be a synchronous rectifier or comprise any semiconductor switch instead of a diode. In some embodiments, the Buck converter 700 may also comprise an input capacitor ($C_1$) 702.

In the Buck mode operation, $S_1$ may be used to control current flow to/from an inductor ($L_1$) 710. Specifically, $S_1$ may be switched on and off (or closed and opened) in an alternating manner, for instance using continuous wave (CW) pulses as control signals to the switch, to connect $L_1$ to Vin, and thus store energy in $L_1$ and discharge the stored energy from $L_1$ onto Vout, respectively. As such, Vout may vary with respect to Vin in a linear manner to the duty cycle for switching on (or closing) and switching off (or opening) $S_1$. $S_1$ may also act to prevent a sudden rise in voltage due to unloading. Since Vout may not exceed Vin in the Buck mode operation, the Buck converter is referred to as a step-down converter.

In the pass-through mode operation, $S_1$ may be kept switched on or closed (and is not switched back off or opened) to allow the input current to pass-through from input to output. Thus, Vin and Vout may be close or about equal, e.g. the difference between Vin and Vout may be due to some resistance in the circuit. Further, $L_1$ and $C_2$ may form a filter that may reduce noise in the circuit and its input and output. $S_1$ may also be used as a protection switch (e.g. to implement a protection function) to switch the converter or voltage regulator off when a faulty condition occurs, for example that is associated with temperature, current, or voltage. In some embodiments, $S_1$ may be controlled to turn on relatively slowly by slowly increasing the gate drive voltage of $S_1$ or the control duty cycle for $S_1$ to bring up Vout relatively slowly without sudden increases in voltage value, and thus provide soft-start to the output. Additionally, in the pass-through mode, the gate drive voltage of $S_1$ may be adjusted to provide more system functions, such as noise filtering, current sharing between multiple voltage regulators, or other functions.

Figure 8:
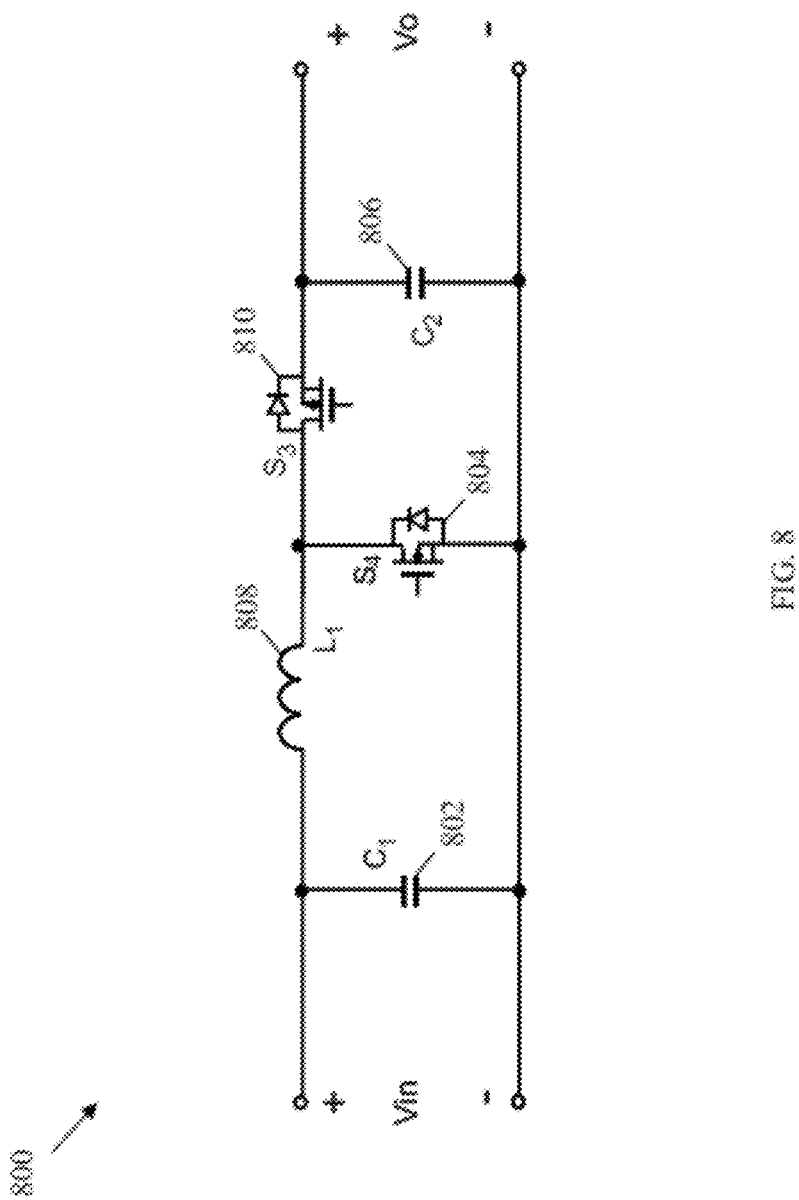
FIG. 8 is a schematic diagram of an embodiment of a Boost converter.

FIG. 8 illustrates an embodiment of a Boost converter 800, which may be used as a non-isolated voltage regulator or a part of the voltage regulator, e.g. in the power system 300. The Boost converter 800 may implement the Boost mode operation and have a built-in pass-through function, e.g. based on an internal switch. The Boost converter 800 may comprise a boost switch ($S_4$) 804 and an output capacitor ($C_2$) 806, which is in parallel to an output voltage (Vout), as shown in FIG. 8. A boost inductor ($L_1$) 808 and a second switch ($S_3$) 810 are also shown. $S_3$ functions as a synchronous rectifier and may be changed to a diode. In some embodiments, the Boost converter 800 may also comprise an input capacitor ($C_1$) 802.

In the Boost mode operation, $S_4$ may be used to control current flow to/from $L_1$. Specifically, $S_4$ may be switched on and switched off (or closed and opened) in an alternate manner, for instance using CW pulses as control signals to the switch, to connect $L_1$ to Vin and thus store energy in $L_1$ and discharge the stored energy from $L_1$ on to Vout, respectively. $S_3$ may act also to prevent sudden rise in voltage due to unloading. Since Vout exceeds Vin in the Boost mode operation, the Boost converter is referred to as a step-up converter.

In the pass-through mode operation, $S_4$ may be kept switched off or opened (and is not switched back on or closed) to allow the input current to pass-through from input to output. Thus, Vin and Vout may be close or about equal, e.g. the difference between Vin and Vout may be due to some resistance in the circuit. Further, $L_1$ and $C_2$ may form a filter that may reduce noise in the circuit and its input and output. Additionally, in the pass-through mode, the gate drive voltage of $S_3$ may be adjusted to provide more system functions, such as noise filtering, current sharing between multiple voltage regulators, or other functions.

Figure 9:
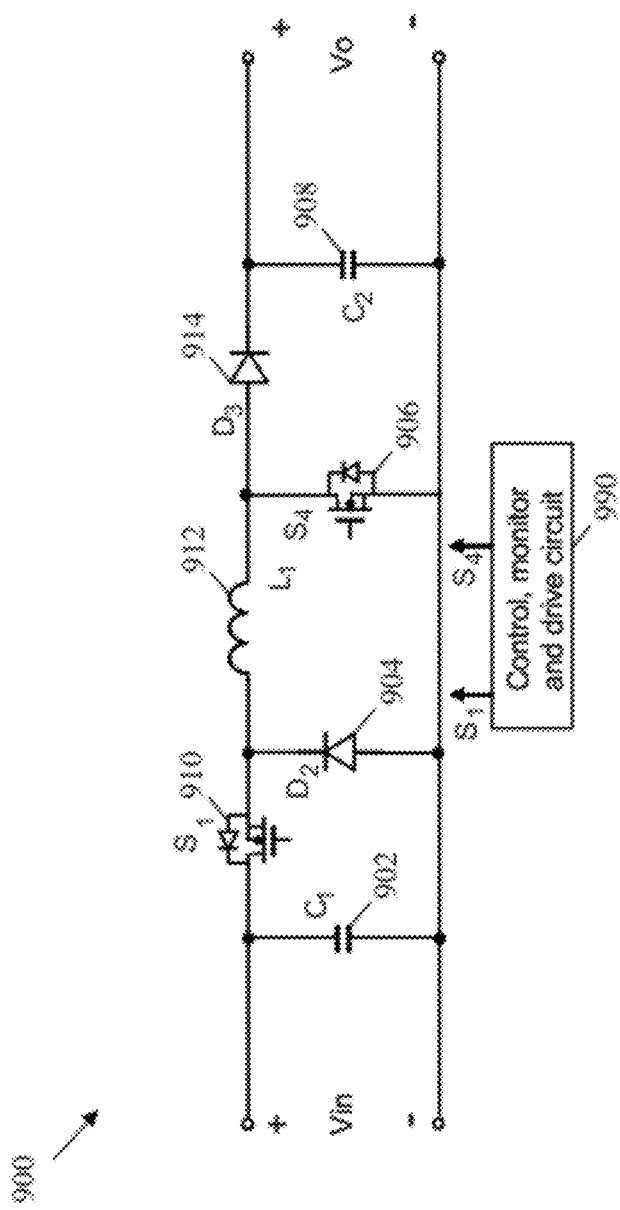
FIG. 9 is a schematic diagram of an embodiment of a Buck-Boost converter.

In an embodiment, a Buck converter and Boost converter, such as the Buck converter 700 and the Boost converter 800, may be combined in series, e.g. in a voltage regulator, to provide both the Buck mode operation and the Boost mode operation. Alternatively, a Buck-Boost converter may be used in the voltage regulator to provide both the Buck mode and Boost mode operations. FIG. 9 illustrates an embodiment of a Buck-Boost converter 900, which may be used as a non-isolated voltage regulator or a part of the voltage regulator, e.g. in the power system 300. The Buck-Boost converter 900 may implement the Buck mode operation and the Boost mode operation and may have a built-in pass-through function.

The Buck-Boost converter 900 may comprise an input capacitor ($C_1$) 902, a buck switch ($S_1$) 910, a freewheeling diode ($D_2$) 904, a boost switch ($S_4$) 906, an inductor ($L_1$) 912, a boost diode ($D_3$) 914, and an output capacitor ($C_2$) 908, which is in parallel to the output voltage (Vout), as shown in FIG. 9. The negative power lead may be used as a common return or a ground for both input and output. Additionally, the Buck-Boost converter 900 may comprise a control, monitor, and drive circuit 990, which may provide CW pulses as separate control signals for each of $S_1$ 910 and $S_4$ 906.

The Buck-Boost converter 900 may operate substantially similar to the Buck converter 700 and the Boost converter 800 to provide the Buck mode, Boost mode, and pass-through mode operations. As such, Vout may be greater than, about equal to, or less than Vin according in the Boost mode, pass-through mode, and Buck mode, respectively.

In the pass-through operation mode, $S_1$ and $D_3$ may be kept switched on and $D_2$ and $S_4$ may be kept switched off to allow the input current to pass-through from input to output. In the Buck mode operation, $S_4$ may be kept switched off to operate the Buck-Boost converter 900 as a Buck converter. As such, $S_1$ may be used as the control switch and $D_2$ may be used as the freewheeling device. In the Boost mode operation, $S_1$ may be kept switched on (and $D_2$ may be switched off) to operate the Buck-Boost converter 900 as a Boost converter. As such, $S_4$ may be used as the control switch and $D_3$ may be used as the freewheeling device. Alternatively, all switches, $S_1$, $D_2$, $D_3$, and $S_4$ may be switched on and off in a sequence that operates the Buck-Boost converter 900 as a buck-Boost converter.

Figure 10:
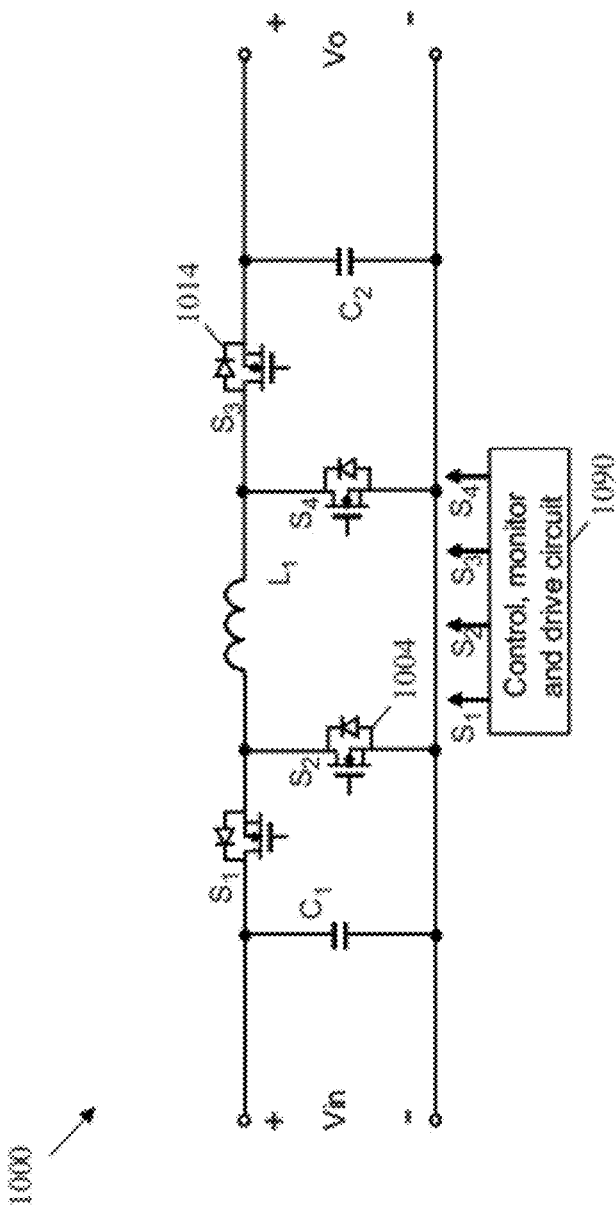
FIG. 10 is a schematic diagram of another embodiment of a Buck-Boost converter.

FIG. 10 illustrates another embodiment of a Buck-Boost converter 1000, which may be used as a non-isolated voltage regulator or a part of the voltage regulator. Similar to the Buck-Boost converter 900, the Buck-Boost converter 1000 may implement the Buck mode operation and the Boost mode operation and may have a built-in pass-through function. The Buck-Boost converter 1000 is similar to the buck-boost converter 900. However, the diodes $D_2$ and $D_3$ in the Buck-Boost converter 900 are replaced with the switches $S_2$ 1004 and $S_3$ 1014, which function as synchronous rectifiers in the Buck-Boost converter 1000. Additionally, the Buck-Boost converter 1000 may comprise a control, monitor, and drive circuit 1090 that provides CW pulses as separate control signals for each of $S_1$, $S_2$, $S_3$, and $S_4$.

Figure 11:
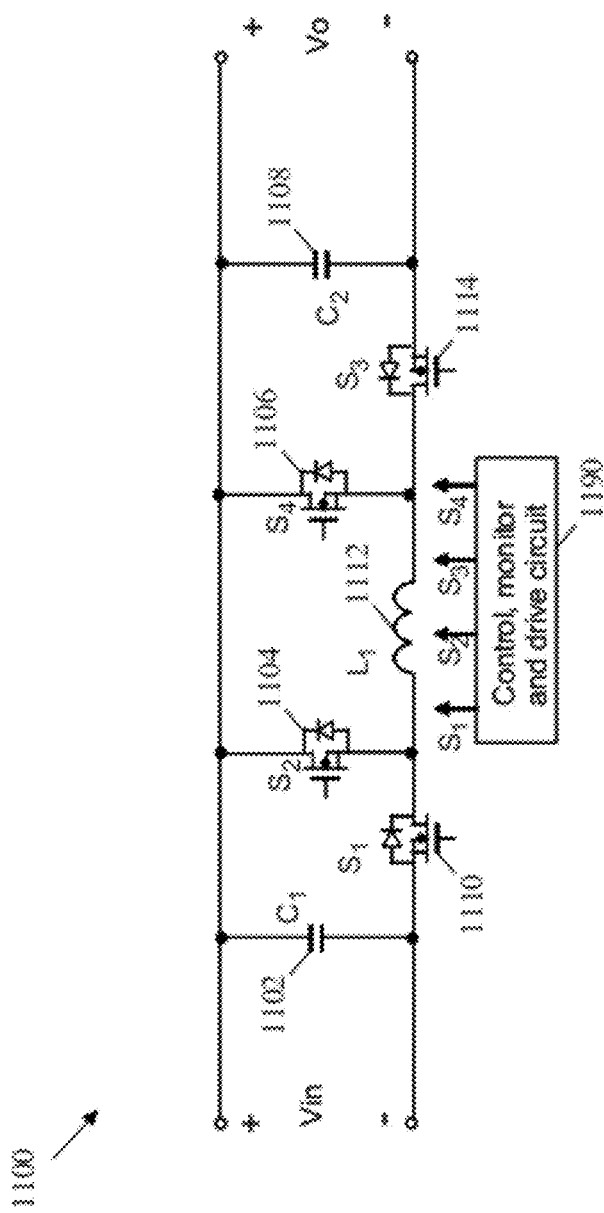
FIG. 11 is a schematic diagram of another embodiment of a Buck-Boost converter.

FIG. 11 illustrates another embodiment of a Buck-Boost converter 1100, which may be used as a non-isolated voltage regulator or a part of the voltage regulator. Similar to the Buck-Boost converters above, the Buck-Boost converter 1100 may implement the Buck mode operation and the Boost mode operation and may have a built-in pass-through function. The Buck-Boost converter 1100 is similar to the buck-boost converter 1000. However, components $S_1$ 1110, $L_1$ 1112, and $S_3$ 1114, are moved to the negative path, so the positive power lead (instead of the negative power lead) may be used as the common return or ground for both input and output. This may be beneficial in some systems, such as in negative input voltage systems, for example in many 48 V based telecommunication systems. Additionally, the Buck-Boost converter 1100 may comprise a control, monitor, and drive circuit 1190 that provides separate control signals for each of $S_1$ 1110, $S_2$ 1104, $S_3$ 1114, and $S_4$ 1106. In other embodiments, the switches $S_2$ 1104 and $S_3$ 1114 may be replaced by the diodes $D_2$ and $D_3$.

In some applications, the power requirements of the electronics equipment may be substantially high. To meet the high power requirements in such applications, a plurality of converters or voltage regulators may be coupled in parallel to provide a plurality of output voltages or a combine output voltage, e.g. using a plurality of input voltages or a combined input voltage, and thus increase the output power. In some cases, a plurality of converters 700, 800, 900, 1000, or 1100 may be combined in parallel to establish a multi-phase converter. As such, each converter may operate as a phase whose switches' state is determined in coordination with the switching states of switches in the remaining converters. The switching state of each converter's switches may be controlled separately using a plurality of corresponding control signals. The different control signals for the different phases may be applied in a synchronous manner with respect to each other to establish multi-phase operation.

In multi-phase or multi-converter applications, current sharing between the different phases, converters, or voltage regulators may be advantageous. For instance, current sharing may be achieved by controlling the duty cycles or the frequencies of the control signals for the different phases. Typically, current sharing schemes may be implemented using one lead (e.g. positive or negative lead) in a non-isolated converter since the other lead may be a common return or ground. However, in some cases, both leads of a converter (e.g. positive and negative leads) may have limited current carrying capability, and thus current sharing on both leads may be needed, so the currents on the positive lead and on the negative lead of a converter, or currents on similar leads in the multiple converters in parallel, can be controlled to be substantially the same. Therefore, it may be advantageous to place some of the components of the converters on both leads to allow current sharing on both leads and improve the overall current carrying capability of the converter.

Figure 12:
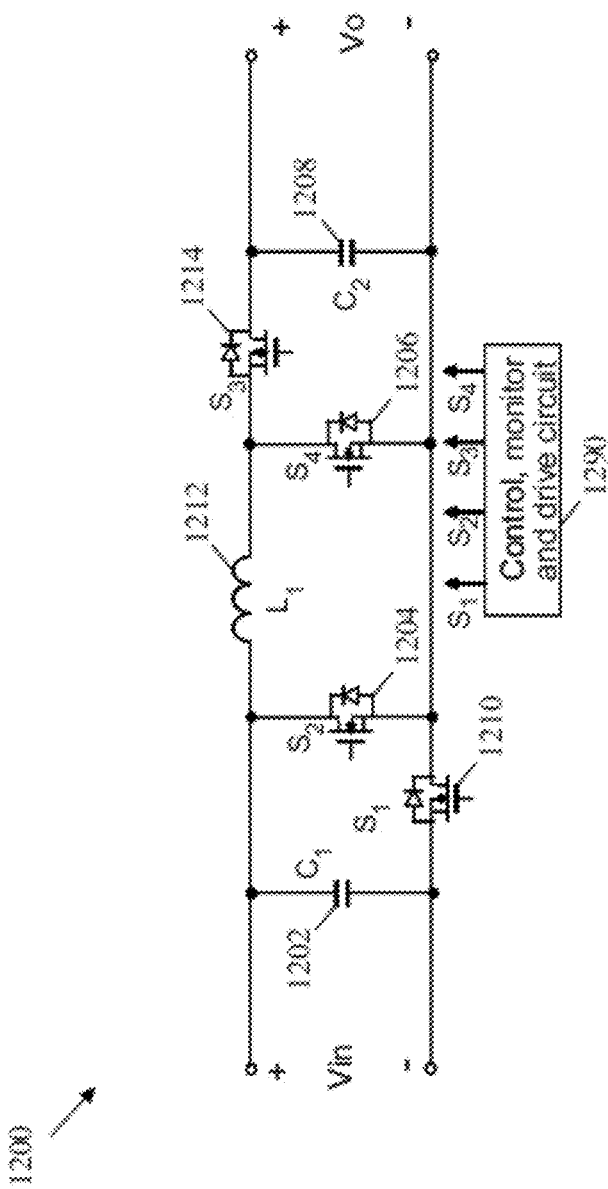
FIG. 12 is a schematic diagram of an embodiment of a new Buck-Boost converter.

FIG. 12 illustrates an embodiment of a Buck-Boost converter 1200, which may support current sharing on both positive and negative power leads. Similar to the Buck-Boost converters above, the Buck-Boost converter 1200 may implement the Buck mode operation and the Boost mode operation and may have a built-in pass-through function. The Buck-Boost converter 1200 may comprise an input capacitor ($C_1$) 1202, a buck switch ($S_1$) 1210, a freewheeling synchronous rectifier switch ($S_2$) 1204, an inductor ($L_1$) 1212, a boost switch ($S_4$) 1206, a boost synchronous rectifier switch ($S_3$) 1214 and an output capacitor ($C_2$) 1208. Additionally, the Buck-Boost converter 1200 may comprise a control, monitor, and drive circuit 1290 that provides separate control signals for each of $S_1$, $S_2$, $S_3$, and $S_4$. The components of the Buck-Boost converter 1200 may be configured and operated substantially similar to the corresponding components of the Buck-Boost converters 1000 and 1100.

The components $S_1$, $L_1$, and $S_3$ may be distributed between the positive and negative leads instead of a single lead, which may allow current sharing on both leads. For instance, the Buck-Boost converter 1200 may be used in a multi-phase or multi-converter configuration for high power communications systems. Accordingly, a plurality of Buck-Boost converters 1200 and/or similar converters may be coupled in parallel in a multi-phase, multi-converter, or multi-voltage regulator system. In such configurations, the gate drive voltages of $S_1$ and $S_2$ may be controlled to regulate the drops in the corresponding voltages and thus adjust relatively the current on each of the leads. This current sharing and current balancing scheme may be necessary in the pass-through mode operation since other active control means may not be available to control the current distribution on the leads. Alternatively, the gate drive duty cycles of $S_1$ and $S_2$ may be controlled to adjust relatively the current on each of the leads.

Figure 13:
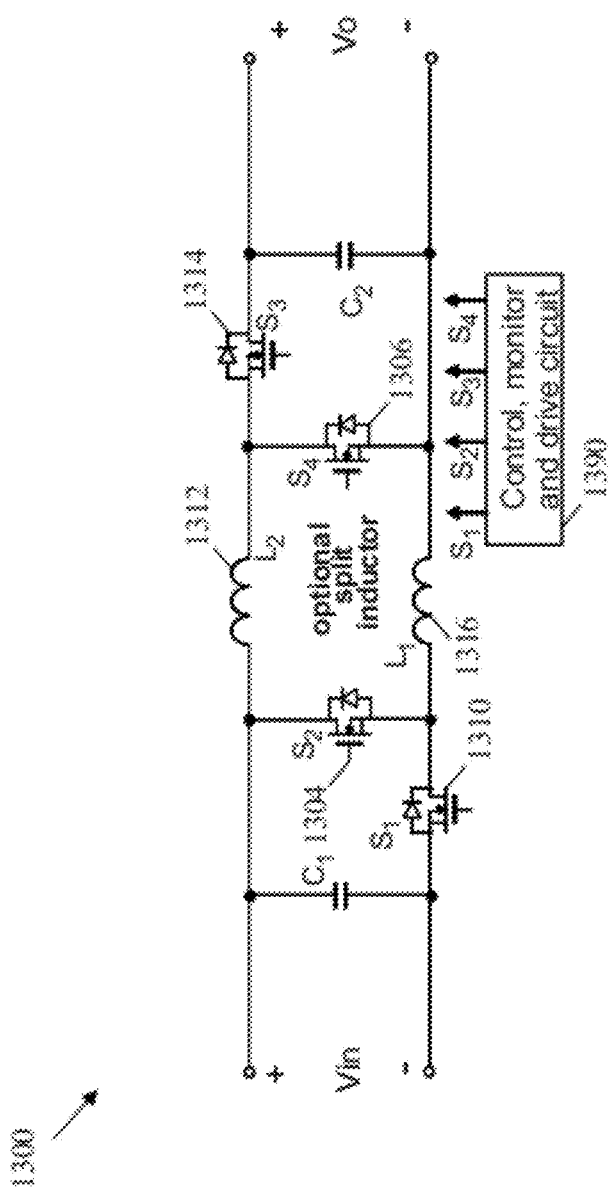
FIG. 13 is a schematic diagram of another embodiment of a new Buck-Boost converter.

FIG. 13 illustrates another embodiment of a Buck-Boost converter 1300, which may support current sharing and split inductor function on both positive and negative power leads. Similar to the Buck-Boost converters above, the Buck-Boost converter 1300 may implement the Buck mode operation and the Boost mode operation and may have a built-in pass-through function. The Buck-Boost converter 1300 is similar to the Buck-Boost converter 1200, but two inductors ($L_2$) 1312 and ($L_1$) 1316 are used, one on the positive path from positive input to the positive output and the other on the negative path from negative input to the negative output. The Buck-Boost converter 1300 may also comprise a control, monitor, and drive circuit 1390 that provides separate control signals for each of $S_1$ 1310, $S_2$ 1304, $S_3$ 1314, and $S_4$ 1306. The components of the Buck-Boost converter 1300 may be configured and operated substantially similar to the corresponding components of the Buck-Boost converters 1200. As such, the components $S_1$ and $S_3$ may be distributed between the positive and negative leads instead of a single lead, which may allow current sharing on both leads. Additionally, the inductor function in the Buck-Boost converter 1300 may be split between both positive and negative paths using two inductors $L_1$ 1316 and $L_2$ 1312 on separate leads instead of one inductor on a single path, which may allow better current sharing of the power leads.

Figure 14:
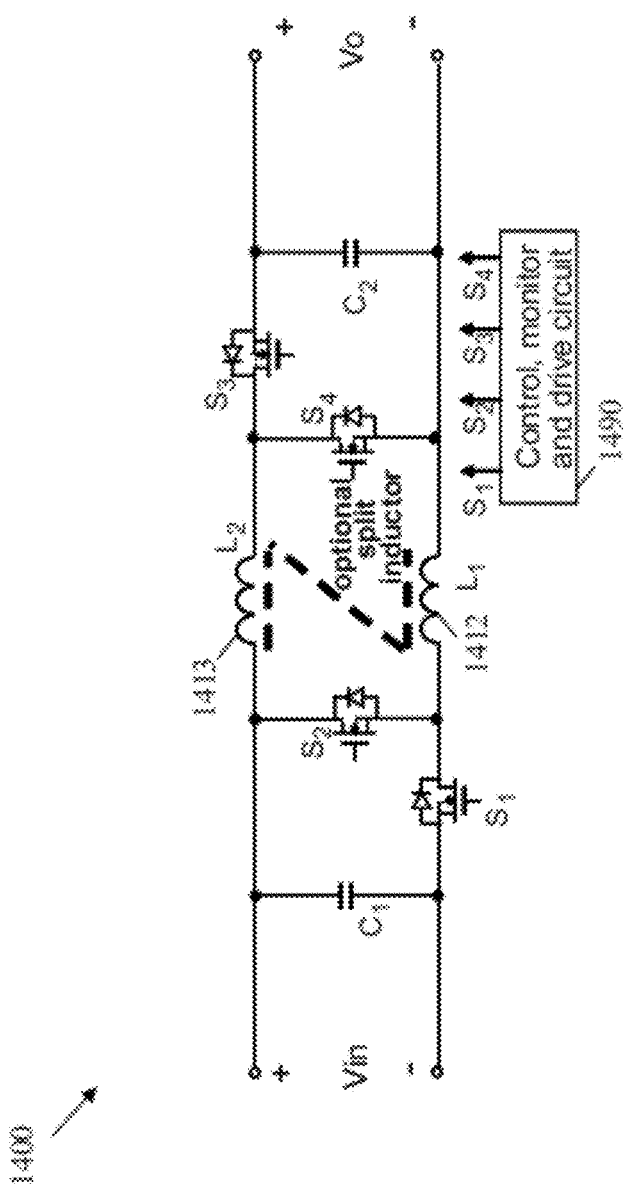
FIG. 14 is a schematic diagram of another embodiment of a new Buck-Boost converter.

FIG. 14 illustrates another embodiment of a Buck-Boost converter 1400, which may support current sharing and comprise coupled inductors on both positive and negative power leads. Similar to the Buck-Boost converters above, the Buck-Boost converter 1400 may implement the Buck mode operation and the Boost mode operation and may have a built-in pass-through function. The Buck-Boost converter 1400 is similar to the Buck-Boost Converter 1300. The components of the Buck-Boost converter 1400 may be configured and operated substantially similar to the corresponding components of the Buck-Boost converters 1300. However, the two inductors $L_1$ 1412 and $L_2$ 1413 on the negative and positive leads, respectively, may be coupled to each other and thus provide mutual inductance. The coupling of the two inductors may be advantageously used to improve the performance of the converter, and/or to reduce the size of the converters as two coupled inductors can be physically implemented as one component. In other embodiments, such as in multi-phase converters, the inductors in different phases (adjacent converters) may also be coupled. Other variations for distributing the inductors and/or switches on both positive and negative leads may also be used to improve system operation and design as needed.

Any of the converters above may be combined in parallel to combine output power to electronics equipments and/or provide current sharing and balancing, such as in high power systems and/or multi-phase applications. In other embodiments, a Buck converter and a Boost converter may be combined in series and the components on both converters may be distributed on both positive path and negative path also to support current balancing on both positive and negative leads.

Figure 15:
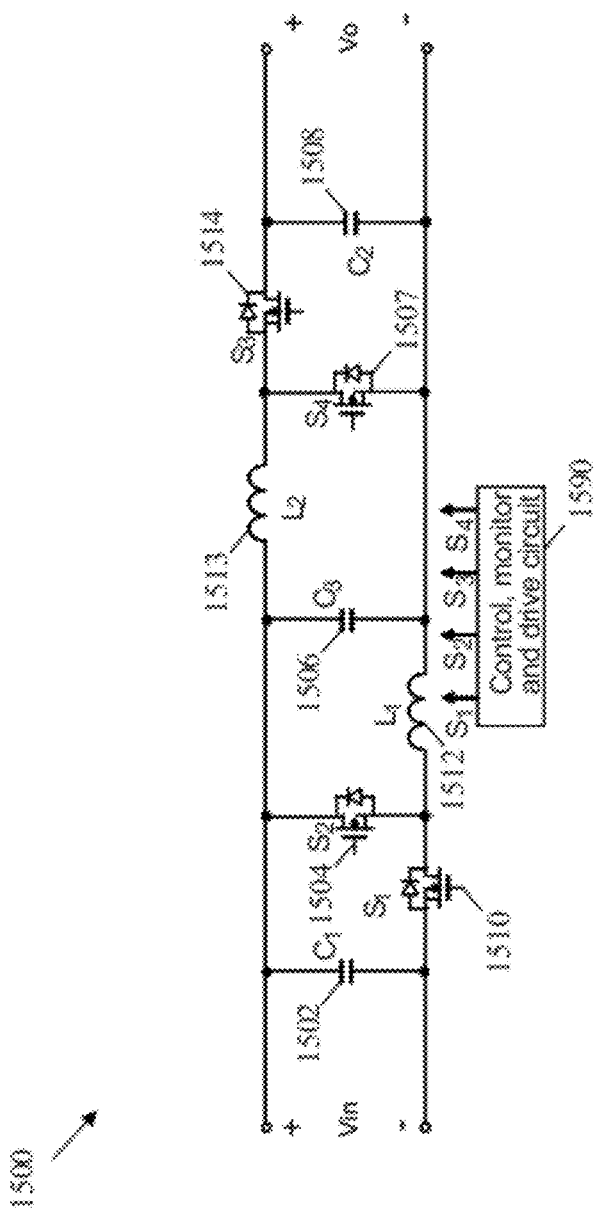
FIG. 15 is a schematic diagram of another embodiment of a new Buck-Boost converter.

FIG. 15 illustrates an embodiment of a Buck-Boost converter 1500, which may comprise a Buck converter and a Boost converter in series and support current balancing on both leads. The Buck-Boost converter 1500 may implement the Buck mode operation and the Boost mode operation and may have a built-in pass-through function. The Buck-Boost converter 1500 may comprise an input capacitor ($C_1$) 1502, a freewheeling switch ($S_2$) 1504, an intermediate capacitor ($C_3$) 1506, a boost switch ($S_4$) 1507, and an output capacitor ($C_2$) 1508, a buck switch ($S_1$) 1510, an inductor ($L_1$) 1512, a second inductor ($L_2$) 1513, and a fourth switch ($S_3$) 1514. The Buck-Boost converter 1500 may also comprise a control, monitor, and drive circuit 1590 that provides control signals for $S_1$, $S_2$, $S_3$, and $S_4$.

The components $C_1$, $S_2$, $C_3$, $S_1$, and $L_1$ may correspond to the Buck converter section of the Buck-Boost converter 1500 and the components $C_3$, $S_4$, $C_2$, $L_2$, and $S_3$ may correspond to the Boost converter section of the Buck-Boost converter 1500. As such, $S_1$, $L_1$, $L_2$, and $S_3$ may be distributed on both positive path and negative path to help current sharing of the power leads. For example, $S_1$, and $L_1$ may be positioned on the negative path and $L_2$ and $S_3$ may be positioned on the positive path. Additionally, $S_1$ and $S_2$ in the Buck converter section and $S_3$ and $S_4$ in the Boost converter section may be controlled, e.g. in a synchronous manner, using the same control, monitor, and drive circuit 1590. Thus, the combined control in the Buck converter and Boost converter sections may regulate current balancing on both leads in synchronization. In some embodiments, the Buck-Boost converter 1500 may be coupled to another converter in parallel and controlled to provide current sharing of all power leads.

Figure 16:
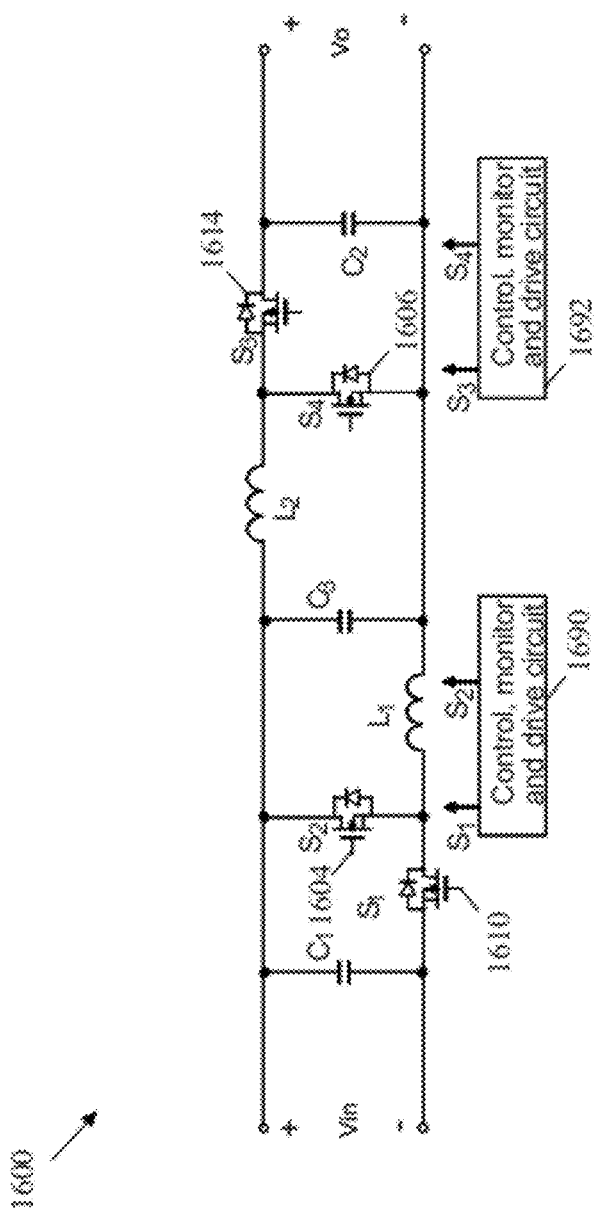
FIG. 16 is a schematic diagram of another embodiment of a new Buck-Boost converter.

FIG. 16 illustrates another embodiment of a Buck-Boost converter 1600 that comprises a Buck converter and a Boost converter in series and support current balancing on both leads. The Buck-Boost converter 1600 may implement the Buck mode operation and the Boost mode operation and may have a built-in pass-through function. The Buck-Boost converter 1600 is similar to the Buck-Boost converter 1500. The components of the Buck-Boost converter 1600 may be arranged and configured substantially similar to the corresponding components of the Buck-Boost converter 1500. However, the control of the Buck converter section can be independent of the control of the Boost converter section.

The Buck-Boost converter 1600 may comprise a first control, monitor, and drive circuit 1690 that provides control signals for $S_1$ 1610 and $S_2$ 1604 in the Buck converter section and a second control, monitor, and drive circuit 1692 that provides separate control signals for $S_3$ 1614 and $S_4$ 1606 in the Boost converter section. As such, $S_1$ 1610 and $S_2$ 1604 in the Buck converter section and $S_3$ 1614 and $S_4$ 1606 in the Boost converter section may be controlled independently using the separate control signals, and the design of the converter may be simplified. $S_2$ 1604 and/or $S_3$ 1614 are shown as synchronous rectifiers in FIGS. 15 and 16 but may be replaced by diodes (e.g. $D_2$ and/or $D_3$) in other embodiments. Further, the Boost converter section may be placed at the input side and the Buck converter section may be placed at the output side in reverse to the order shown in FIGS. 15 and 16.

In some power systems, a plurality of power inputs may be combined before the voltage regulator stage or after the voltage regulator stage. Alternatively, in some embodiments, the inputs may be combined in the voltage regulator stage. Combining the inputs before or within the voltage regulator stage may be advantageous, since a single set of power delivery components and connections may be used to deliver the power from the combining point, which may reduce cost and improve power efficiency. The inputs may be combined using a plurality of diodes, controlled switches, and/or other combination devices.

Figure 17:
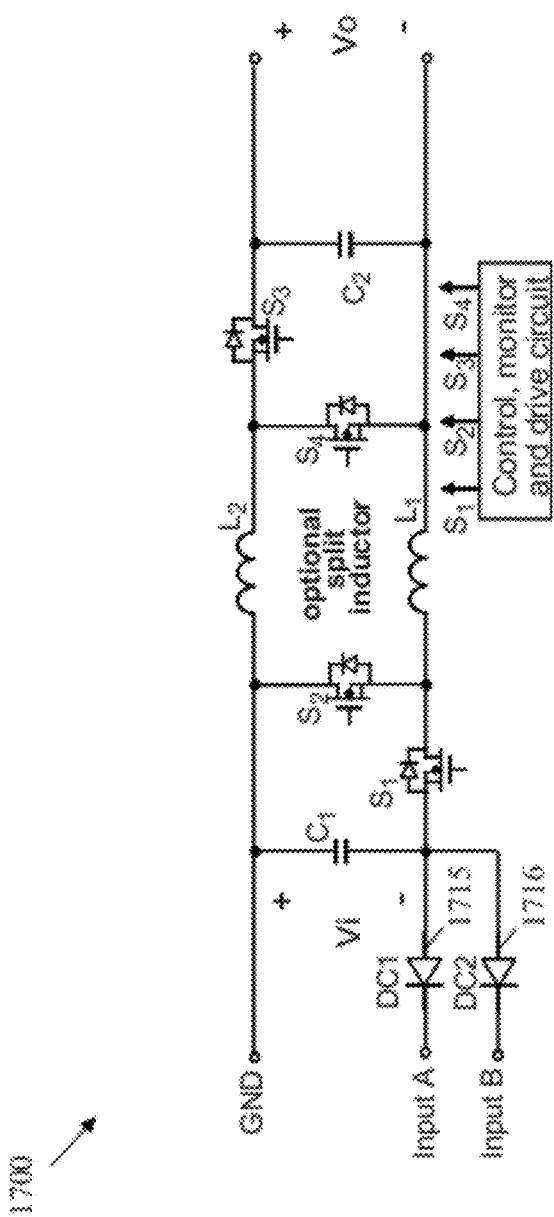
FIG. 17 is a schematic diagram of another embodiment of a new Buck-Boost converter.

FIG. 17 illustrates an embodiment of a Buck-Boost converter 1700, which may combine a plurality of inputs. The Buck-Boost converter 1700 may implement the Buck mode operation and the Boost mode operation and may have a built-in pass-through function. The Buck-Boost converter 1700 is similar to the Buck-Boost converter 1300, but has the addition of combining diode (DC1) 1715 for a first input (Input A) and a second combining diode (DC2) 1716 for a second input (Input B). The diodes DC1 1715 and DC2 1716 may be configured to receive and select Input A and/or Input B. For instance, if both Input A and Input B are received, e.g. at about the same time, then the combining diodes DC1 1715 and DC2 1716 may select the input that corresponds to a higher voltage value (e.g. more negative voltage) as the active input to the converter. Alternatively, if only one of the inputs is received, e.g. at a time instance, then the diodes may pass that input to the converter. This combining scheme to select an active input to the converter may improve the reliability of the power system. In other embodiments, the diodes DC1 1715 and DC2 1716 may be replaced by corresponding switches, such as Power MOSFETs to select the active input. The switches may also be controlled to provide useful system functions, such as filtering and/or current sharing between different converters or voltage regulators. Further, the inputs may be coupled on a single lead, e.g. positive lead, directly as shown in FIG. 17 or via combination devices on both leads in other embodiments. Although, only two diodes for two inputs are shown in FIG. 17, in other embodiments, the Buck-Boost converter 1700 may comprise any quantity of diodes for a plurality of corresponding inputs.

In some embodiments, a plurality of converters or voltage regulators may be coupled in parallel and configured as a redundant voltage regulator system. As such, if one or more converters or voltage regulators fail, the redundant voltage regulator system may still provide power output to the end system. In one embodiment, the redundant voltage regulator system may comprise an ORing diode or an ORing switch, such as MOSFET, which may be coupled to the output of each of the coupled converters. The ORing diode or switch may be configured to receive and select output from any of the coupled converters.

Figure 18:
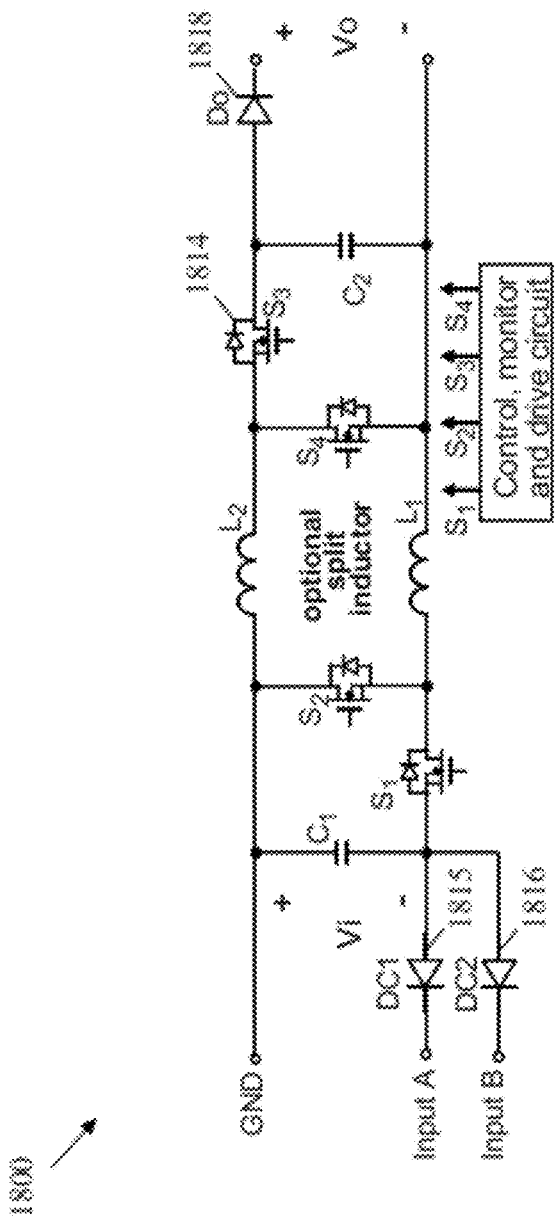
FIG. 18 is a schematic diagram of another embodiment of a new Buck-Boost converter.

FIG. 18 illustrates an embodiment of a Buck-Boost converter 1800, which may combine a corresponding output (Vout) with the output of another coupled converter (not shown) via an ORing diode. The Buck-Boost converter 1800 may also combine a plurality of inputs. The Buck-Boost converter 1800 may implement the Buck mode operation and the Boost mode operation and may have a built-in pass-through function. The Buck-Boost converter 1800 is similar to the Buck-Boost converter 1700, but has the addition of an ORing diode (Do) 1818, e.g. on the positive output lead to combine output power from a plurality of converters. In other embodiments, Do 1818 may be replaced by an ORing switch. Alternatively, Do 1818 may be removed and the output of the Buck-Boost converter 1800 may be directly combined with the output of any other converter that may be coupled to the output of the Buck-Boost converter 1800.

In another embodiment, DC1 1815 and DC2 1816 may be moved to the output of two corresponding converters, e.g. similar to the Buck-Boost converter 1800, and in such case the output ORing diode 1818 may not be needed. As such, each input may be regulated or converted by a separate converter and then combined at a common output. Thus, if an input fails or is not received in any of the converters, the corresponding converter may not output power but the remaining converter(s) may still output power. However, in this scheme, multiple sets of converters, e.g. one for each input, may be needed, which may increase system cost and space requirement. In some embodiments, the switch or diode in the converter may be used, e.g. as an ORing device, to combine output power. For example, in any of the converters above, $S_3$ 1814 or $D_3$ may be use as the ORing device, which may improve system reliability without substantially increasing cost or reducing efficiency.

Figure 19:
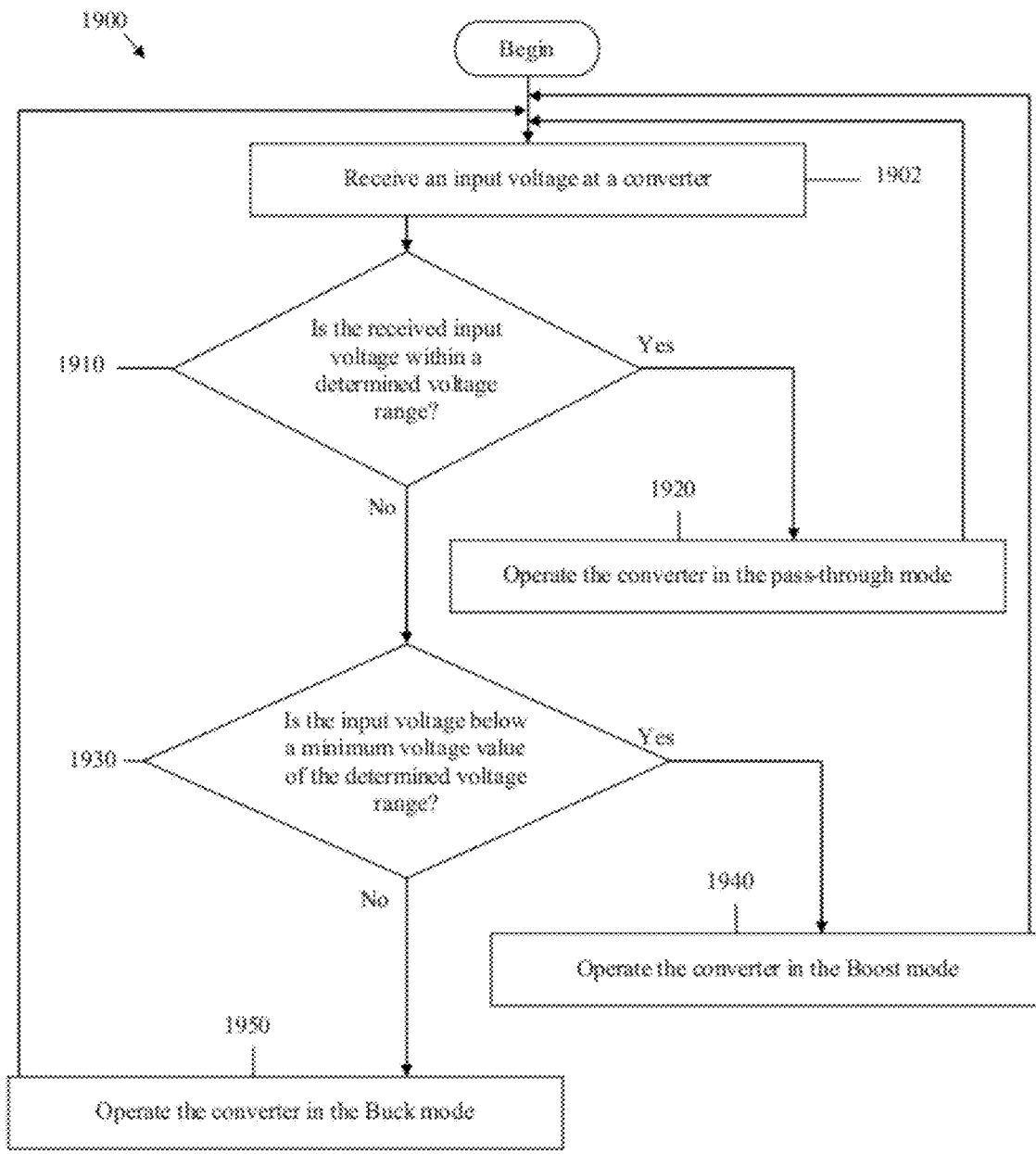
FIG. 19 is a flowchart of an embodiment of a pass-through mode based method.

FIG. 19 illustrates an embodiment of a pass-through mode based method 1900, which may be implemented using any of the voltage regulators or converters above. Based on the method 1900, the converter or voltage regulator may operate most of the time or a substantial amount of the operation time in the pass-through mode. During the pass-through mode, the circuit switches may not be active and the power/voltage output may be about equal to or close to the power/voltage input and within a tolerated voltage range. As such, the method 1900 may improve power consumption and power efficiency and density in the power system components.

The method 1900 may begin at block 1902, where an input voltage may be received at a converter (or a voltage regulator). The input voltage may be received from a single power source, a combined power source, or may be selected from a plurality of received inputs from a plurality of power sources. At block 1910, the method 1900 may determine whether the received input voltage is within a determined voltage range. The determined voltage range may be selected to reduce power consumption and increase power efficiency and density in the system. For example, increasing the voltage range may increase the total operation time of the pass-through operation mode, and thus reduce power consumption. Additionally, the voltage range may be limited to avoid receiving substantially high voltage values, which may cause substantial stress on the circuits and/or electronics equipment, and substantially low voltage values, which may not be suitable to operate the circuits and/or electronics equipment.

The method 1900 may proceed to block 1920 if the condition in block 1910 is met. Otherwise, the method 1900 may proceed to block 1930. At block 1920, the converter (or voltage regulator) may be operated in the pass-through mode, and the method 1900 may then return to block 1902 to receive new input voltage. As such, the converter switches may be configured in a fixed or constant on or off state, e.g. may not be switched on and off in a continuous or alternating manner, to allow the input voltage to pass substantially unchanged. At block 1930, the method 1900 may determine whether the input voltage is below a minimum voltage value (or threshold) of the determined voltage range. The method 1900 may proceed to block 1940 if the condition in block 1930 is met. Alternatively, if the input voltage is above a maximum voltage value (or threshold) of the determined voltage range, then the method 1900 may proceed to block 1950.

At block 1940, the converter (or voltage regulator) may be operated in the Boost mode, and the method 1900 may then return to block 1902. As such, the converter switches may be controlled and switched, e.g. in a continuous or alternating manner, to provide an output voltage that is greater than the input voltage and within the determined voltage range. At block 1950, the converter (or voltage regulator) may be operated in the Buck mode, and the method 1900 may then return to block 1902. As such, the converter switches may be controlled and switched to provide an output voltage that is less than the input voltage and within the determined voltage range. In some embodiments, the Block mode or the Boost mode operation may not be necessary. Therefore, the method 1900 may not implement the Buck mode in Block 1940 or the Boost mode in block 1950.

Figure 20:
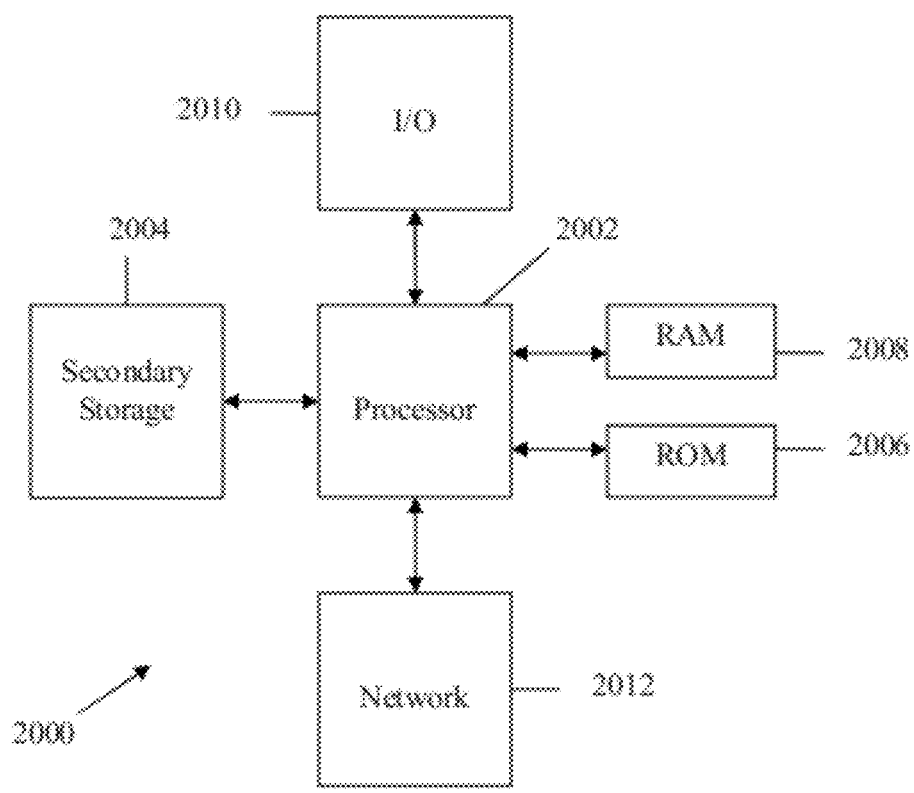
FIG. 20 is a schematic diagram of an embodiment of a general-purpose computer system.

The control systems described above may be implemented on any general-purpose network equipment, such as a computer or router with sufficient processing power, memory resources, and network throughput capability to handle the necessary workload placed upon it. FIG. 20 illustrates a typical, general-purpose network equipment 2000 suitable for implementing one or more embodiments of the components disclosed herein. The network equipment 2000 includes a processor 2002 (which may be referred to as a central processor unit or CPU) that is in communication with memory devices including secondary storage 2004, read only memory (ROM) 2006, random access memory (RAM) 2008, input/output (I/O) devices 2010, and network connectivity devices 2012. The processor 2002 may be implemented as one or more CPU chips, or may be part of one or more application specific integrated circuits (ASICs).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A power system comprising:
    a non-isolated voltage regulator configured to couple to an input voltage source,
    wherein the non-isolated voltage regulator is in a power distribution system and configured to;
        receive an input voltage from the input voltage source;
        boost the input voltage from the input voltage source to generate an output voltage for the non-isolated voltage regulator when the input voltage is less than an output voltage range for the non-isolated voltage regulator;
        reduce the input voltage from the input voltage source to generate the output voltage for the non-isolated voltage regulator when the input voltage is greater than the output voltage range for the non-isolated voltage regulator; and
        pass-through the input voltage from the input voltage source as the output voltage for the non-isolated voltage regulator when the input voltage is within the output voltage range for the non-isolated voltage regulator.

2. The power system of claim 1, wherein the non-isolated voltage regulator is coupled to a circuit card via a backplane or bus, and wherein the input voltage source is a direct current (DC) power source or an alternating current (AC) power source.

3. The power system of claim 1, wherein the output voltage range for the non-isolated voltage regulator is configured such that the non-isolated voltage regulator operates in a pass-through mode during steady state operation.

4. The power system of claim 1, wherein the output voltage range for the non-isolated voltage regulator comprises a minimum input voltage that is passed-through as the output voltage and a maximum input voltage that is passed-through as the output voltage.

5. The power system of claim 1, wherein the output voltage is at a constant voltage when the non-isolated voltage regulator boosts the input voltage to generate the output voltage for the non-isolated voltage regulator, and wherein the output voltage is greater than the input voltage when the non-isolated voltage regulator boosts the input voltage.

6. The power system of claim 1, wherein the output voltage is at a constant voltage when the non-isolated voltage regulator reduces the input voltage to generate the output voltage for the non-isolated voltage regulator, and wherein the output voltage is less than the input voltage when the non-isolated voltage regulator reduces the input voltage.

7. The power system of claim 1, wherein boosting the input voltage generates the output voltage such that increases in the input voltage correspond to increases in the output voltage of the non-isolated voltage regulator.

8. The power system of claim 1, wherein reducing the input voltage generates the output voltage such that decreases in the input voltage correspond to decreases in the output voltage of the non-isolated voltage regulator.

9. The power system of claim 1, wherein the output voltage matches the input voltage when the non-isolated voltage regulator passes-through the input voltage as the output voltage of the non-isolated voltage regulator.

10. The power system of claim 1, wherein the non-isolated voltage regulator is further configured to stop boosting the input voltage to generate the output voltage at the output of the non-isolated voltage regulator when the output voltage is within the output voltage range.

11. The power system of claim 1, wherein the non-isolated voltage regulator is further configured to stop reducing the input voltage to generate the output voltage at the output of the non-isolated voltage regulator when the output voltage is within the output voltage range.

12. The power system of claim 1, wherein the output voltage range is narrower than a range of input voltages provided by the input voltage source.

13. A non-isolated voltage regulator comprising:
    a positive input voltage lead;
    a positive output voltage lead coupled to the positive input voltage lead to form a positive voltage line;
    a negative input voltage lead;
    a negative output voltage lead coupled to the negative input voltage lead to form a negative voltage line;
    a first switching component located on the positive voltage line and positioned between the positive input voltage lead and the positive output voltage lead; and
    a second switching component located on the negative voltage line and positioned between the negative input voltage lead and the negative output voltage lead,
    wherein the second switching component is configured to disconnect the negative input voltage lead and the negative output voltage lead on the negative voltage line when the second switching component is open, and
    wherein the first switching component and the second switching component are configured to bypass a voltage converter when the first switching component and the second switching component are each closed.

14. The non-isolated voltage regulator of claim 13, further comprising:
    a first inductor located on the positive voltage line and coupled between the positive input voltage lead and the positive output voltage lead; and
    a second inductor located on the negative voltage line and coupled between the negative input voltage lead and the negative output voltage lead.

15. The non-isolated voltage regulator of claim 13, further comprising:
  a third switching component positioned between the positive voltage line and the negative voltage line; and
  a fourth switching component positioned between the positive voltage line and the negative voltage line,
  wherein at least one of the first switching component, the second switching component, the third switching component, and the fourth switching component is a diode.

16. The non-isolated voltage regulator of claim 14, wherein the first inductor and the second inductor are coupled to each other.

17. The non-isolated voltage regulator of claim 15, further comprising:
  a first control circuit configured to provide a switching signal for the first switching component and the second switching component; and
  a second control circuit configured to provide a second switching signal for the third switching component and the fourth switching component,
  wherein the first control circuit and the second control circuit operate independently to provide the switching signal and the second switching signal.

18. The non-isolated voltage regulator of claim 15, wherein the fourth switching component is switched off and the first switching component is switched on such that the non-isolated voltage regulator operates in a buck mode, and wherein the buck mode reduces an input voltage received at the positive input voltage lead and the negative input voltage lead to produce an output voltage outputted at the positive output voltage lead and the negative output voltage lead.

19. The non-isolated voltage regulator of claim 15, wherein the third switching component is switched off and the second switching component is switched on such that the non-isolated voltage regulator operates in a boost mode, and wherein the boost mode boosts an input voltage received at the positive input voltage lead and the negative input voltage lead to produce an output voltage outputted at the positive output voltage lead and the negative output voltage lead.

20. The non-isolated voltage regulator of claim 15, wherein the third switching component and the fourth switching component are switched off and the first switching component and the second switching component are switched on such that the non-isolated voltage regulator operates in a pass-through mode, and wherein the pass-through mode supplies an input voltage received at the positive input voltage lead and the negative input voltage lead as an output voltage outputted at the positive output voltage lead and the negative output voltage lead.

* * * * *